United States Patent
Hartley et al.

(10) Patent No.: US 7,489,107 B2
(45) Date of Patent: Feb. 10, 2009

(54) OPTIMAL BATTERY CHARGING FOR DAMAGE MITIGATION

(75) Inventors: Tom Hartley, Mogadore, OH (US); Carl Lorenzo, Cleveland, OH (US)

(73) Assignee: The University of Akron, Akron, OH (US)

( * ) Notice: Subject to any disclaimer, the term of this patent is extended or adjusted under 35 U.S.C. 154(b) by 7 days.

(21) Appl. No.: 10/517,674

(22) PCT Filed: May 30, 2003

(86) PCT No.: PCT/US03/17028

§ 371 (c)(1),
(2), (4) Date: May 26, 2005

(87) PCT Pub. No.: WO03/103071

PCT Pub. Date: Dec. 11, 2003

(65) Prior Publication Data

US 2005/0248315 A1    Nov. 10, 2005

(51) Int. Cl.
*H02J 7/00*    (2006.01)
(52) U.S. Cl. .................. 320/132; 320/134; 320/136; 324/427; 324/430; 324/431; 702/63
(58) Field of Classification Search .............. 320/107, 320/118–119, 132–137, 146, 166, 128, 130, 320/145, 106; 429/99–100; 324/427, 430, 324/431; 702/63
See application file for complete search history.

(56) References Cited

U.S. PATENT DOCUMENTS

| | | | | |
|---|---|---|---|---|
| 4,360,762 A * | 11/1982 | Yamamoto et al. | .......... | 315/101 |
| 5,204,611 A * | 4/1993 | Nor et al. | ..................... | 320/145 |
| 5,252,906 A * | 10/1993 | Busson | ....................... | 320/132 |
| 5,652,502 A * | 7/1997 | van Phuoc et al. | ............ | 702/63 |
| 5,691,621 A * | 11/1997 | Phuoc et al. | ................. | 320/134 |
| 6,015,296 A * | 1/2000 | Fenkanyn et al. | ........... | 434/301 |
| 6,118,248 A * | 9/2000 | Gartstein et al. | ............ | 320/107 |
| 6,160,382 A * | 12/2000 | Yoon et al. | ................... | 320/136 |
| 6,373,226 B1 * | 4/2002 | Itou et al. | .................... | 320/132 |
| 6,577,104 B2 * | 6/2003 | Sakakibara | ................. | 320/132 |
| 2002/0120906 A1 * | 8/2002 | Xia et al. | ....................... | 716/2 |
| 2002/0195998 A1 * | 12/2002 | Yu | .............................. | 320/134 |
| 2004/0130294 A1 * | 7/2004 | Ng et al. | ..................... | 320/128 |

* cited by examiner

*Primary Examiner*—Akm E Ullah
*Assistant Examiner*—M'Baye Diao
(74) *Attorney, Agent, or Firm*—Roetzel & Andress; Joseph J. Crimaldi

(57) ABSTRACT

A system and method for charging and thus extending the life of an electrical storage device is disclosed. The system provides for developing an essentialized cell model structure of the electrical storage device; determining model parameters for charge-discharge data of the structure; and determining charge-discharge behavior of the structure in a voltage-charge plane. The method also includes measuring voltage values of the structure based upon the charge-discharge behavior; and deriving an instantaneous damage rate from the measured voltage values. The method further includes developing a charging profile based upon the instantaneous damage rate, wherein the charging profile optimizes a charging current with respect to the damage per cycle so as to extend the overall life of the electrical storage device. The method also includes the ability of the system to track the parameters of the electrical storage device as the device changes with time.

12 Claims, 20 Drawing Sheets

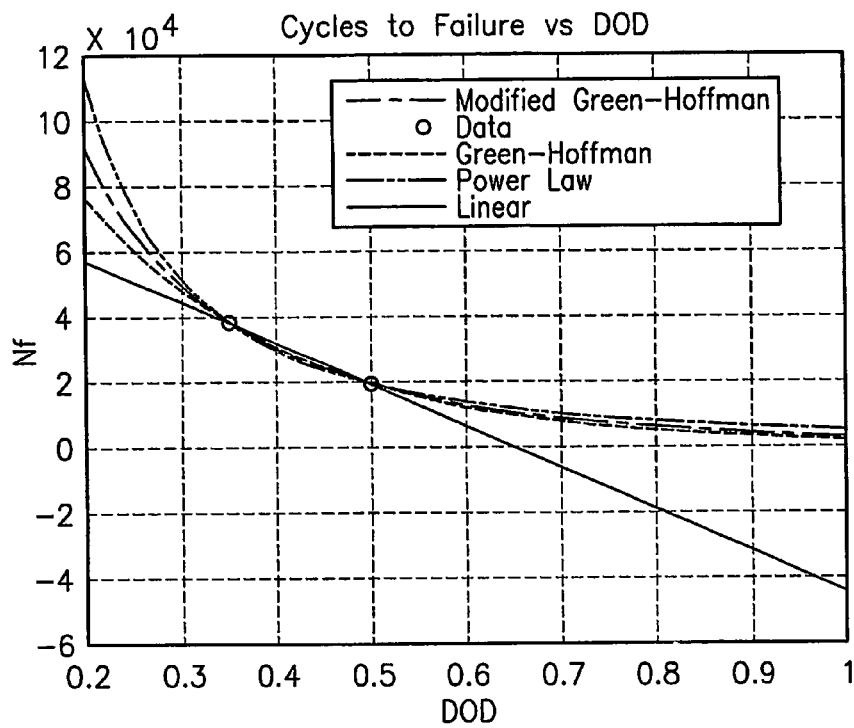

FIG-11

```
Load previous best
Set j=1
    Guess u(jT)
        Initialize simulation
            Main simulation loop
                Derivative function evaluations
                Numerical integration (Euler, T=1)
                Damage rate calculation
                Integrate damage rate
            End main loop
            Include final state error into Performance Measure
        Change u(jT) using gradient search and repeat until optimal
    Increment j and repeat
Reset j=1 and repeat until optimal
Store present best
```

FIG-12

```
Load previous best
    Guess u(t) function coefficients
    Initialize simulation
        Main simulation loop
            Derivative function evaluations
            Numerical integration (Euler, T=1)
            Damage rate calculation
            Integrate damage rate
        End main loop
        Include final state error into Performance Measure
    Change u(t) function coefficients using gradient search and repeat until optimal
Store present best
```

FIG-14

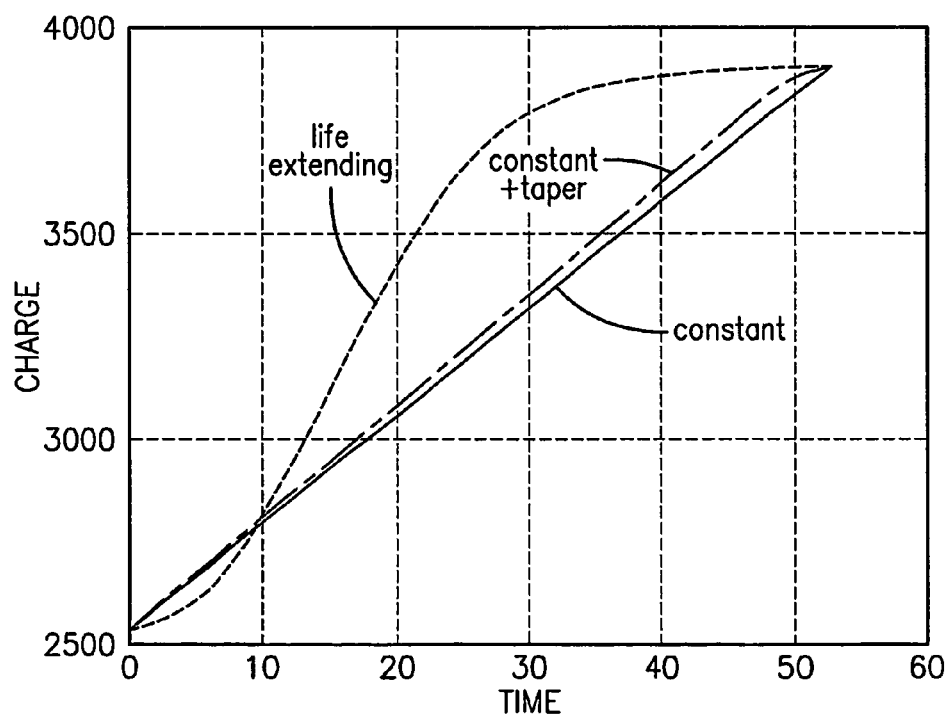

FIG-15A

OPTIMAL BATTERY CHARGING FOR DAMAGE MITIGATION

TECHNICAL FIELD

This invention relates to model-based control methods in the charging and discharging of batteries and fuel cells to provide improved performance and longer life.

BACKGROUND OF THE INVENTION

Nickel-hydrogen cells, as shown in FIG. 1, have been used in space applications for many years. The main advantages of nickel-hydrogen cells are high specific energy, long cycle life, long functional lifetime, and fairly robust chemistry. The long cycle life has been used to advantage in low earth orbit (LEO) applications where a satellite will orbit the earth every 90 minutes. Roughly 35 minutes of this orbit is spent in the earth's shadow, during which time the satellite must use the batteries for power. The other 55 minutes of the cycle is spent in sunlight, during which time the satellite is powered by solar panels that must also recharge the batteries. In these applications, up to 50000 charge-discharge cycles are common for nickel-hydrogen cells.

Nickel-hydrogen cells are essentially a hybrid of standard cells and fuel cells. The positive electrode is nickel (NiOOH), and the negative electrode is hydrogen that diffuses into a porous platinum electrode. The platinum only serves to provide a reaction site for the hydrogen gas, and does not participate in the reaction. The entire cell consists of a large sealed pressure vessel that contains the hydrogen gas and the electrode stack. The electrode stack alternates pineapple-slice shaped disks of nickel electrode, separator (containing the electrolyte, KOH), platinum electrode, and a hydrogen diffusion screen.

Given the very significant costs of powering satellites and space stations it is very desirable to extend the life of nickel-hydrogen cells as much as possible to reduce the cost of replacing the batteries in a space station or requiring the use of a new satellite when an old satellite could still function. Accordingly, there is a need in the art for a system to carefully control the re-charging of a nickel-hydrogen cell and any other electrical storage devices in a manner to mitigate damage during charging and extend the life of the storage device.

SUMMARY OF THE INVENTION

It is thus an object of the present invention to provide optimal battery charging for damage mitigation.

Another object of the present invention, which shall become apparent as the detailed description proceeds, is achieved by method for charging an electrical storage device so as to extend the life thereof, comprising: developing an essentialized cell model structure of the electrical storage device; determining model parameters for charge-discharge data of the structure; and determining charge-discharge behavior of the structure in a voltage-charge plane.

Other aspects of the present invention are attained by an optimal re-charging controller for an electrical storage device, comprising a simulation processor receiving an input signal sent to the electrical storage device and a measured output signal generated by the electrical storage device, wherein the simulation processor models a plurality of states of the electrical storage device and generates an estimated output signal so that the controller mitigates damage to the electrical storage device. The simulation processor includes a feedback component which receives the measured output signal and the estimated output signal to generate a correction signal. And the processor includes an observer component which receives the correction signal and the input signal to generate the estimated output signal and an estimated internal state signal, wherein the estimated output signal converges a plurality of modeled dynamic states to corresponding states of the electrical storage device. Along with this there is a damage rate sensor that receives inputs signals from the electrical storage device and estimated states from the observer component to provide the control system with an instantaneous damage rate which is then used to modify the charging signal so that damage is reduced during charging.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 11 is a graphical representation of the cycle life as a function of depth of discharge (DOD);

FIG. 12 is an outline of a slow optimization approach;

FIGS. 13A-D are graphical representations of exemplary charging profiles from a slow optimizer, at constant current charging and optimal charging, wherein FIG. 13A shows the charging profile as a function of charge, FIG. 13B shows the charging profile as a function of current, FIG. 13C shows the charging profile as a function of damage rate, and wherein FIG. 13D shows the charging profile as a function of voltage;

FIG. 14 is an outline of a fast optimization approach;

FIGS. 15A-F are graphical representations of exemplary charging profiles from 65 to 100 percent fully charged, using a faster optimizer, wherein FIG. 15A shows the charging profile as a function of charge, FIG. 15B shows the charging profile as a function of current, FIG. 15C shows the charging profile as a function of damage rate, and wherein FIG. 15D shows the charging profile as a function of normalized accumulated damage, FIG. 15E shows the charging profile as a function of voltage, and FIG. 15F compares charge and voltage;

FIGS. 16A-F are graphical representations of exemplary charging profiles from 60 to 95 percent fully charged, using a faster optimizer, wherein FIG. 16A shows the charging profile as a function of charge, FIG. 16B shows the charging profile as a function of current, FIG. 16C shows the charging profile as a function of damage rate, and wherein FIG. 16D shows the charging profile as a function of normalized accumulated damage, FIG. 16E shows the charging profile as a function of voltage, and FIG. 16F compares charge and voltage;

FIGS. 17A-F are graphical representations of exemplary charging profiles from life extending charging methods, wherein FIG. 17A shows the charging profile as a function of charge, FIG. 17B shows the charging profile as a function of current, FIG. 17C shows the charging profile as a function of damage rate, and wherein FIG. 17D shows the charging profile as a function of normalized accumulated damage, FIG. 17E shows the charging profile as a function of voltage, and FIG. 17F compares charge and voltage;

BEST MODE FOR CARRYING OUT THE INVENTION

Figure 1:
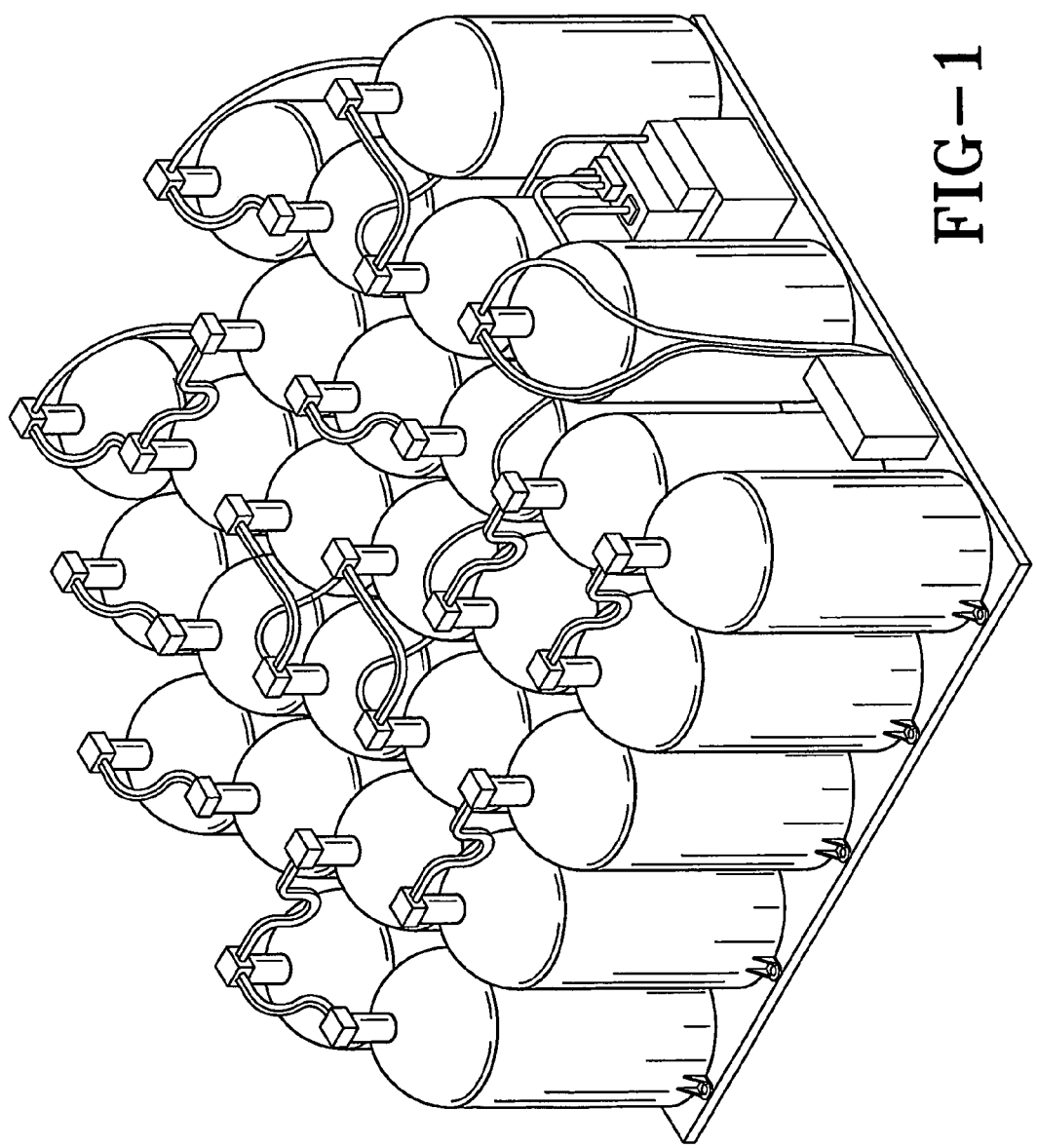
FIG. 1 is a photographic representation of a typical $NiH_2$ battery configuration.

In order to understand the concepts of the present invention, a detailed discussion will be provided for an exemplary electrical storage device—nickel-hydrogen cell—which is modeled and the specific parameters of the device determined for complete and full evaluation. It will be appreciated that the model selected for this particular type of electrical storage device are equally applicable to other electrical storage devices and as such the teachings of the present invention may find a wide range of applications in this field of technology.

NiH$_2$ Cell Chemistry

In normal charge-discharge operation of a nickel-hydrogen cell, the electrochemical reactions are as follows:

positive nickel electrode: (1)

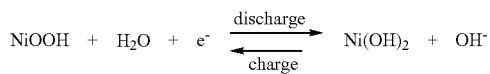

negative hydrogen electrode: (2)

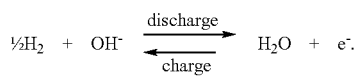

During discharge at the positive electrode, the NiOOH (nickel oxy-hydroxide) on the electrode reacts with water in the electrolyte at the surface of the electrode as it accepts an electron from the external circuit through the nickel substrate. The products of this reaction are the Ni(OH)$_2$ (nickel hydroxide) on the electrode, and OH$^-$ (hydroxyl ion) which diffuses away from the from the electrode through the electrolyte in the separator. At the negative electrode, the hydrogen gas reacts with hydroxyl ions in the electrolyte to form water and release an electron in to the external circuit. This process is reversed during charging. The electrolyte, which is often 31% KOH solution in water, contains potassium ions, K$^+$, and hydroxyl ions, OH$^-$, dissolved in water. Clearly the water and the hydroxyl ions are important in the reactions at the electrodes. It is usually assumed that the potassium ions do not take an active part in the cell reactions, however its exact role in the overall cell behavior is unclear.

During charging, overcharge reactions can occur. These occur whenever the charging current drives the above reactions faster than the required mass transfer can happen. This can occur both when the nickel electrode is fully charged, and when the charging current is too large. Thus, in overcharge, the nickel and the hydrogen do not participate in the reactions, and the electrolyte is reacting electrochemically at both electrodes. The overcharge reactions are as follows:

positive nickel electrode: (3)

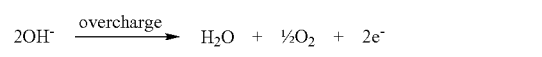

negative hydrogen electrode: (4)

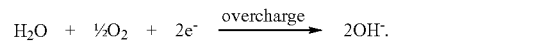

Consideration of these reactions would seem to indicate that overcharge is not a problem, but the formation of oxygen in a hydrogen environment is potentially very dangerous.

In a collection of cells composing battery, cell reversal can sometimes occur when a single cell discharges completely before other cells. This cell then becomes a load on the other cells. If the cell is assumed to be nickel limited, the reversal reactions are as follows:

positive nickel electrode: (5)

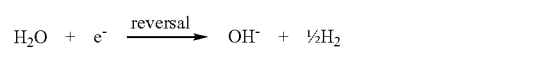

negative hydrogen electrode: (6)

It should be observed that the hydrogen gas that is generated at the positive electrode is consumed at the same rate at the negative electrode. Thus there is no net increase in hydrogen pressure or any net change in electrolyte concentrations during reversal, and the cell can be operated continuously in this mode.

Performance Model for NiH$_2$ Batteries

Dynamic Modeling Background

Control systems are often used to improve the performance of many systems and devices. Typically the quality of the control is related to the level of understanding of the system being controlled. This system knowledge is contained in the system dynamic model. Useful models for control design are dynamic, that is, represented by differential equations, and are of reasonably low order (requiring only a few differential equations) while still capturing the important dynamics of the specific system. A more complicated model, such as a computational fluid dynamic (CFD) model, will have thousands of differential equations (or dynamic states). This type of model is useful for a detailed understanding of battery phenomena and for cell design. Such a model, however, can contain states that are impractical to control, and can lead to a control system that is unnecessarily complex. Furthermore, a CFD model is often only represented as a computer code, and effectively no equations are available to the control system designer. On the other hand, a less complicated model, such as an empirical input-output relationship, may not contain any differential equations at all. This static model will usually not allow good control system design. Thus, to design a good control system, a low order dynamic model of the system to be controlled is most useful. This model should capture enough of the dynamic behavior of the system to be accurate over the frequency range of interest, while not being overly complicated.

In the area of battery and fuel cell modeling, there would appear to be two common types of model, CFD-based and empirical. The highly accurate CFD-based models are based on first principles, and accurately model the diffusion of all of the active species through whatever media are present. Such models require a large number of electrochemical parameters, including things such as ion mobilities and reaction rate constants. Also required is specific geometrical construction data on a given cell. These models are highly accurate and provide good representations of cell dynamics as long as the cell configuration remains constant. Unfortunately, as actual cells are charged and discharged, their dynamic parameters do not remain constant, and these models typically do not provide good representations for electrochemical cells over many charge-discharge cycles. Additionally, the exact construction varies from cell to cell, and thus these models do not quite have the actual cell information. In terms of using these models for control, there are also a large number of states due to the representation of many species diffusing through the cell. Furthermore, the spatial lumping of such diffusive systems usually yields a dynamic system that is very stiff. Such systems are difficult to simulate, and rather than programming such a set of differential equations, an implicit simulation method is implemented directly on the diffusion equations in the computer code without the generation of any useful mathematical model on paper. Finally, these CFD-based models are expensive to build and change, while also being slow to build and use.

At the other modeling extreme from the CFD-based models are the empirical models. These model typically have a specific algebraic structure, and the model parameters are identified from given data. These are usually simple models that may provide reasonable static operating point representations of a given cell as it charges or discharges. Other than having a built in integral to track the charge, these models are usually not dynamic. Consequently, they can be considered as static maps, such as that of a transistor or of a compressor. Although they can predict an operating point, they do not accurately represent dynamic changes. Thus, the empirical models are not adequate for control system design.

A less common approach to battery and fuel cell modeling is what could be termed a hybrid model, or a performance model. Models of this type attempt to keep the important first principles dynamics, while not becoming so complicated as to not be readily useful. Their parameters are then tuned to match experimental data. This can be called essentializing the model. This model has a chosen structure based on an electrochemical understanding of cell behavior. Given this dynamic model structure, the parameters of the model are determined for a given cell from charge-discharge data. An important aspect of this model is the representation of the many diffusion processes internal to the cell by a fractional order system. Consequently the model is of low order (few dynamic states with some fractional) and can be used for many different cell chemistries. A model of this type is fast, understandable, and amenable to control design. Furthermore, it is possible to update the parameters in the model as the cell changes through its charge-discharge cycles. Thus the hybrid modeling approach should provide a useful model structure for understanding cell changes through time, while also providing a useful dynamic model for control design.

Overview of $NiH_2$ Cell Dynamics

Figure 2:
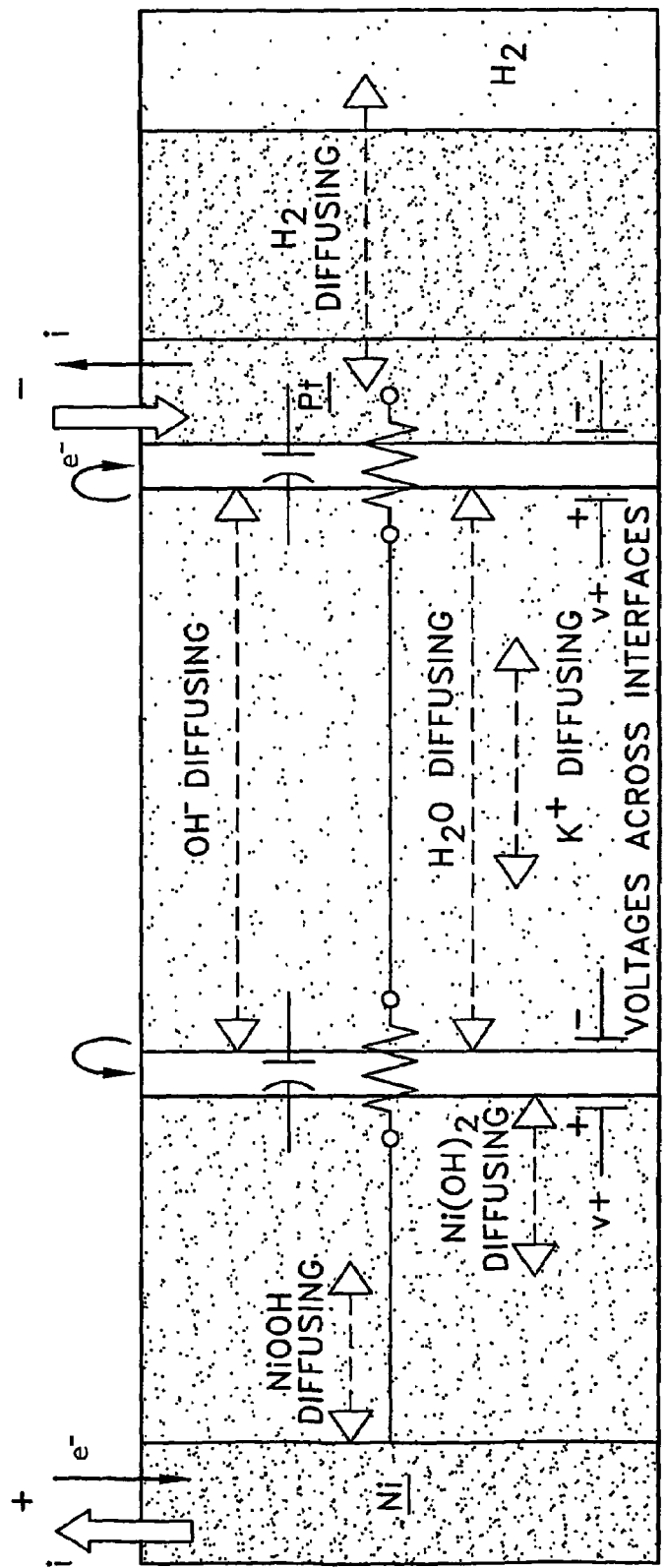
FIG. 2 is a schematic diagram of the dynamic components of an $NiH_2$ cell.
Figure 3:
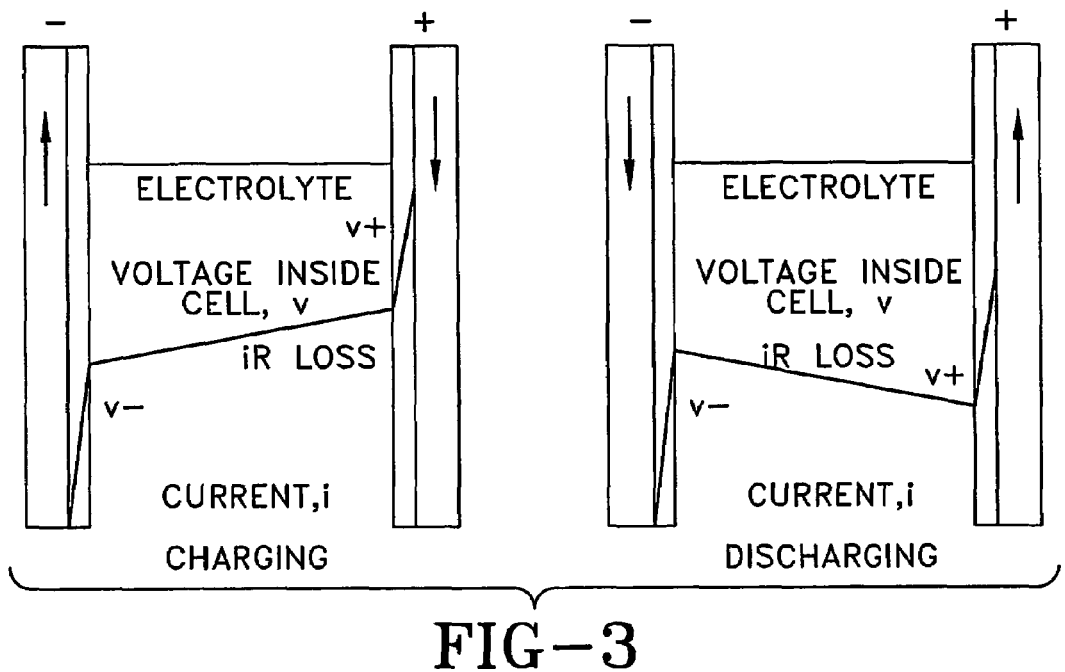
FIG. 3 is a schematic diagram of typical voltage profiles inside a cell.

As in most electrochemical systems, the dynamics of $NiH_2$ cells are quite complex. This section presents an overview of the electrical and material behavior in a cell. FIG. 2 gives a generic structure of the major components of the cell dynamics in normal operation. Here the electrical and material contributions have been separated for clarity. At each electrode, a voltage is generated between the electrode and the electrolyte based on the concentrations of reactants. The reactants then diffuse into the reaction site or away from the reaction site. The hydrogen gas must diffuse into the platinum electrode from the ambient chamber. The nickel compounds may not diffuse, but it is not clear if the reaction front at the nickel electrode is diffuse or not. Also, the hydroxyl ions and the water must diffuse from one electrode to the other through the electrolyte. The electrolyte diffusion represents a major resistance to the flow of charge through the cell. An additional source of electrical resistance is the charge transfer resistance at the electrode surface, across which there is also a double later capacitance. A voltage profile inside a typical cell is shown in FIG. 3. There it is shown that voltage is produced between the electrode-electrolyte interfaces. It is shown later that these voltages are dependent upon species concentrations on either side and on the current passing through. Additionally there is always an ohmic voltage loss in the electrolyte due to current passing through. It should be noted that this ohmic loss always corresponds to heating.

Model Essentialization

To extract the essence of the dynamics from the complex model given in FIG. 3, several assumptions are made. The major assumption is that one electrode dominates the dynamics of the cell. In this case, a hydrogen rich environment, and the nickel electrode is dominant in the dynamic behavior. At this electrode, only the amount of charged material is assumed. $C_s$ is tracked, not the discharged material on the electrode. Also, all of the diffusive behavior into one fractional order term, $C_d$, is lumped together which alleviates the need to model several diffusion channels in the cell. Finally, the voltage generated at the electrode will depend on the concentrations of both the stored material and the diffusing material at the electrode surface, and will be used as the terminal voltage. With these assumptions, the essential model is shown in FIG. 4.

Figure 4:
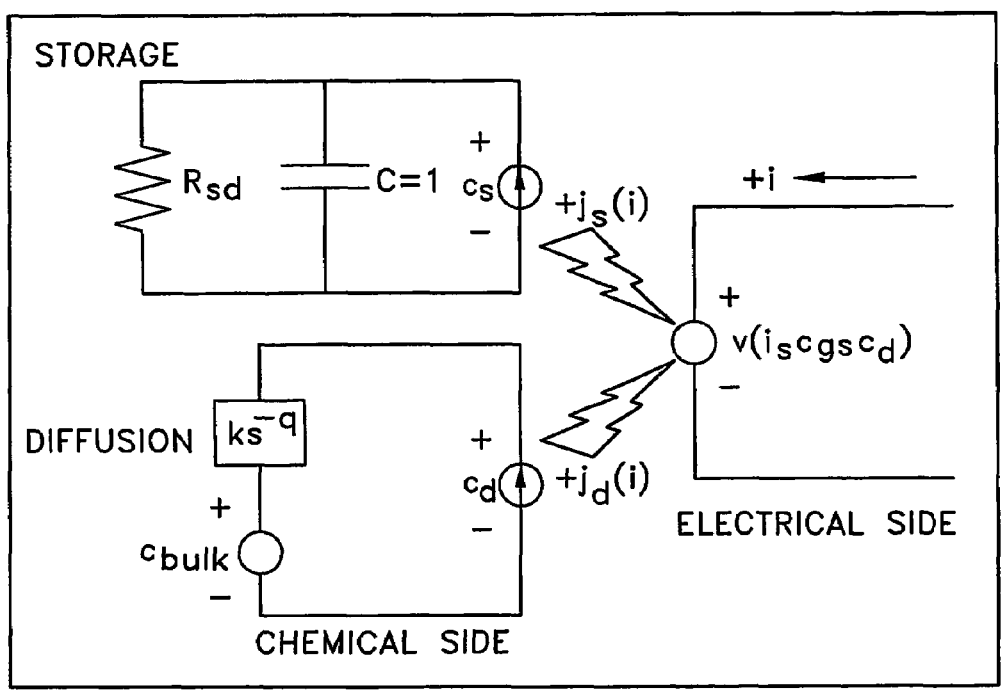
FIG. 4 is a schematic diagram of an essentialized performance model of an $NiH_2$ cell.

In the FIG. 4, the electrical behavior is shown in the right side of the figure, and the chemical species behavior is shown on the left side. On the electrical side, the voltage at the terminals, v, is due to the dependent voltage source that is a function of electrical current, i, concentration of charged material, $c_s$, and concentration of diffusing material, $c_d$, at the electrode. On the chemical side, an electrical analogy of the material mass transfer is used. In the analogy, mass flow rate becomes current (or flux), j, and material concentration becomes voltage. Thus the two dependent current sources on the chemical side are mass flow rates, $j_s$ and $j_d$, defined by the current on electrical side. The charged material is stored in a capacitor, C, that represents mass storage, with the addition of the self-discharge resistor, $R_{sd}$, representing an orifice for the loss of charged material. The diffusing material must pass through a fractional-order element, $ks^{-q}$, that is an agglomeration of all the various diffusion pathways in the actual cell.

This fractional-order element separates the concentration of diffusing material at the electrode, $c_d$, from the concentration in the bulk of the electrolyte, $c_{bulk}$.

The effective chemical reaction in the cell then becomes

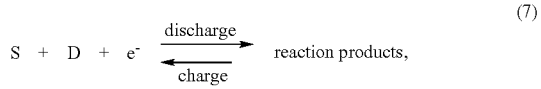

(7)

where charge conservation is assumed in the essentialized model. Here S represents the reacting stored material and D represents the reacting diffusing material. The stored material in a NiH$_2$ cell is often associated with NiOOH, and the diffusing material with either H$_2$O or OH$^-$, but this is only for mental imagery and not inherent to the math model. The reaction products could also be tracked if it were necessary for the accuracy of the model, but they are not believed necessary. Based on this approximate cell reaction, during discharge, the stored material reacts with the diffusing material and an electron. Thus, when current is leaving the battery (electrons entering), both the stored and diffusing material are being deleted at the active electrode. Note that it could have been assumed the diffusing material was building up outside the electrode during discharge, rather than going to zero, but that would have added complexity. And it will be appreciated that a thermal model is not developed directly for the essentialized model. It is assumed that the heating effects are related to the cell damage, and that the damage model developed later will contain the necessary information. Heating is also considered later where energy flow, or power, in the cell is discussed.

Electrode Behavior: Faraday's Law

For the discussion of the next two sections, consider the electrode process:

$$aA+bB \rightleftharpoons cC+dD+ne^-$$ (8)

This states that chemical species A and B are converted to species C and D plus electrons, at rates related to the coefficients a,b,c,d,n (it is also assumed that these compounds are appropriately ionized so that charge is conserved). It is important to understand that this equation represents both a chemical process and an electrical process. In fact, the reaction rates can be completely determined using the electrical process by recognizing that the chemical conversion can only occur if electrons are either arriving or leaving. Thus, the chemical conversion rates are controlled by, or measured by, the electrical current passing through a given electrode. All the rates of chemical conversion are then known via the following observation. For every n electrons leaving the electrode, c molecules of C are produced, d molecules of D are produced, a molecules of A are consumed, and b molecules of B are consumed. Then recognizing that the rate of electron production is related to electrical current i, the following rate equations result:

$$-i \equiv \frac{dq_{e^-}}{dt} = -\frac{d}{n}\frac{dD}{dt} = -\frac{c}{n}\frac{dC}{dt} = +\frac{a}{n}\frac{dA}{dt} = +\frac{b}{n}\frac{dB}{dt},$$ (9)

Where $q_{e^-}$ is the charge of a single electron. It should be noted that concentrations of chemical species are often used. Concentration is defined as moles of the species per unit volume. Concentrations are also often represented by [A] or by $c_A$, which would represent the concentration of species A. Using concentrations, the previous equation becomes:

$$-i = nF\frac{dc_{e^-}}{dt} = -d\frac{dc_D}{dt} = -c\frac{dc_C}{dt} = +a\frac{dc_A}{dt} = +b\frac{dc_B}{dt}$$ (10)

where F is the Faraday constant relating the moles of electrons in a coulomb, F=96484.6 Coul/mole.

Electrode Behavior: Electrode Equation

Once the concentration rates on either side of the electrode interface are known, it is important to obtain an expression of the voltage in terms of these concentrations. This can be done by considering conservation of charge through the interface. Again assuming the reaction of Equation (8), the required relationship is determined by considering the fluxes, j, of the species in the forward and reverse reactions at the electrode, $$i=j_f-j_r.$$ (11)

Assuming that the species fluxes are proportional to concentrations, yields $$i=k_f c_A^a c_B^b - k_r c_C^c c_D^d.$$ (12)

Here, the rate constants, k, can be related to the electrical potential across the electrode-electrolyte interface using free energy considerations, $$k_f = k_0 e^{(F/RT)(1-\alpha)(v-v_0)}$$ (13)

$$k_r = k_0 e^{(F/RT)(-\alpha)(v-v_0)}$$ (14)

where R is the universal gas constant, T is the temperature in K, $\alpha$ is an electrode energy barrier symmetry factor, $v-v_0$ is the voltage deviation from some nominal voltage $v_0$, and $k_0$ is a rate factor.

Inserting these gives the electrode equation, $$i=k_0(c_A^a c_B^b e^{(F/RT)(1-\alpha)(v-v_0)} - c_C^c c_D^d e^{(F/RT)(-\alpha)(v-v_0)}).$$ (15)

This equation is important to both the electrical and chemical behavior of the electrode-electrolyte interface as it relates the voltage across the interface to the concentrations of active species on either side of the interface and to the electrical current passing through the interface. It is often called the current-potential characteristic, and the approach used is often referred to as the Butler-Volmer approach.

Thus, for an electrode-electrolyte interface satisfying a reaction given by Equation (8), the required equations relating electrical current through the interface, electric potential across the interface, and species concentrations on either side of the interface are Equation (10) and Equation (15). These equations can also be used in a multiport configuration to relate and separate the electrical variables from the chemical variables. Consequently, these two equations are fundamental to representing the behavior of any electrified interface.

Linear-in-the-Parameters Electrode Equation

The electrode equation is highly nonlinear, particularly when solving for the voltage in terms of the concentrations and the current. It is almost always solved using numerical methods, such as Newton-Raphson iteration. As an alternative to doing this, we propose a linear-in-the-parameters approximate solution to the electrode equation Thus, the form we have chosen is:

$$v=k_1+k_2\ln(1+|i|)\text{sgn}(i)+k_3\ln(c_d)+k_4\ln(1-c_s)$$ (16)

where the variables i, $c_s$, $c_d$ correspond to those in our essential model and the k's are parameters to be determined from data. What this equation assumes is that the terminal voltage v, is equal to the sum of four terms, and is effectively a compromise between the Tafel and the Nernst solutions of the electrode equation. The Nernst solution assumes that the current is so small as to be negligible. The electrode equation is then easily solved for the voltage in terms of the concentrations, $$v = v_0 + \frac{RT}{nF}\ln\left(\frac{c_s}{c_d}\right). \quad (17)$$

Alternatively, the Tafel solution assumes that the current is large in one direction or the other, which means that one of the two exponential terms is negligible. With one of the exponentials equal to zero, the electrode equation is easily solved for the terminal voltage in terms of the current, $$v = v_0 + \frac{RT}{\alpha nF}\ln(k_0) - \frac{RT}{\alpha nF}\ln(i). \quad (18)$$

In the linear-in-the-parameters approximate solution to the electrode equation, Equation (16), the first term is the constant $k_1$, which represents the voltage at the fully charged, zero current, steady state concentrations condition. It also represents the $v_0$ terms in the Nernst and Tafel solutions. The second term represents the nonlinear logarithmic dependence on current from the Tafel solution. The problem with the Tafel solution is that it assumes the current is large in one direction, but not both, while the approximation must be applicable to currents in both directions. Taking this into consideration yields the compromise term with the abs and sgn functions. The third and fourth terms represent the Nernst dependence on concentrations on either side of the charge storage reaction (and ignoring the fact that one reactant is in the solid state). The third term represents all the collective diffusion terms, as well as the electrolyte ions that are being consumed or generated at the electrode surface. As this concentration goes to zero, the terminal voltage gets small. As this concentration goes up, it has less and less effect on the voltage. The fourth and last term represents the effect of stored charge. As the stored charge approaches one, the voltage gets big. If it ever gets to zero, the voltage will also get small.

Other major benefits to the linear-in-the-parameters approximate solution is that it is possible to identify the 4 k-parameters directly from charge/discharge data using the batch or recursive least squares method. The requirement to do this is the actual measured terminal voltage and current, along with the estimated transient values of the stored charge and the diffusive material.

Note also that the charge transfer resistance through the double layer is contained implicitly in the current term in the linear-in-the-parameters approximation. Likewise, the double-layer capacitance explicitly is not modeled, as it is also implicit in the linear-in-the-parameters approximation as well as the diffusive term.

Charge Storage

The charge storage will be through charge accumulation by integrating the current. Using the electrical analogy, this element is effectively capacitive. Any charge that passes into or out of the cell, will directly effect the concentration of the stored charge via Faraday's law, $$\dot{c}(t) \cdot i(t). \quad (19)$$

Diffusion Behavior

The diffusive components are lumped into one fractional-order term. This term effectively represents the diffusion of material toward or away from the electrode through the electrolyte, and with our assumed reaction, is thus on the same side of the reaction equation as the stored charge

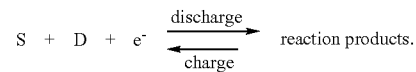

As a fractional-order element, its transfer function is $$\frac{c_d(s)}{i(s)} = k_d s^{-q} \quad (20)$$

where s is the Laplace variable, and $k_d$ and q are constant to be determined from data. However, the diffusive material concentration must return to the assumed bulk value when the system is quiescent. Thus the equation is converted to the time-domain and modified to reflect this return to bulk concentration $$c_d(t) = c_{bulk} - k_{d\,0}d_t^{-q}i(t). \quad (21)$$

It should be remembered that fractional-order terms have time-varying initialization functions associated with them. These were determined to have an overall effect on the diffusive terms of less than 3% our specific study, and were not included (ignored). If the implemented battery model is used in other ways after this study, the initialization functions may need to be included, which might also require further adjustment of the constants in Equation (21).

Self-Discharge

Self-discharge is implemented through a simple resistive (to flow) loss across the charge storage element, $$i_{sd} = \frac{c_s}{R_{sd}}. \quad (22)$$

This should be thought of as a pathway for stored material to leak out of storage (bigger $R_{sd}$, less loss).

Ohmic Cell Resistance

Most conducting media provide some resistance to the passage of electrical current. One could attempt to use one of the many ways that this is often calculated in electrochemical cells for our model, but in this case the current term in the linear-in-the-parameters electrode equation is used to implicitly represent this resistance. If a value of resistance is needed, it can be obtained by linearizing the linear-in-the-parameters electrode equation. This is done here since the resistance of a cell is often discussed. Noting that resistance can be defined from Ohm's law as $$R \equiv \frac{dv}{di}, \text{ then} \quad (23)$$

-continued $$R_{Ohmic} = \frac{dv}{di} \quad (24)$$
$$= \frac{d(k_1 + k_2\ln(1+|i|)\text{sgn}(i) + k_3\ln(c_d) + k_4\ln(1-c_s))}{di},$$

or $$R_{Ohmic} = \frac{dv}{di} = \frac{d(k_2\ln(1+|i|)\text{sgn}(i))}{di}. \quad (24)$$

One can evaluate this for any steady-state current. Evaluating at zero steady-state current for symmetry gives $$R_{Ohmic} = \left[\frac{k_2}{1+|i_{ss}|}\right]_{i_{ss}=0} = k_2. \quad (25)$$

Thus the linear-in-the-parameters electrode equation gives a direct measure of the total Ohmic resistance in the cell at zero current, which includes both the charge transfer resistance at the electrodes, and the Ohmic resistance of the electrolyte.

Essentialized Model Overview

The model structure is given in FIG. 4. The system dynamic equations are repeated below to highlight the required parameters.

Terminal behavior: current into the battery is $+i$, (26)

the terminal voltage is $+v$, stored material with self-discharge: $\dot{c}_s(t) = i(t) - \frac{1}{R_{sd}}c_s(t),$ (27)

diffusing material: $c_d(t) = c_{bulk} - k_{d0}d_t^{-q}i(t),$ (28)

electrode equation: $v(c_s, c_d, i) = k_1 + k_2\ln(1+|i|)\text{sgn}(i) +$ (29)
$k_3\ln(c_d) + k_4\ln(1-c_s).$ From this we can see that the required parameters are, self-discharge resistance $R_{sd}$, fractional-order q and constant $k_d$, bulk concentration of the diffusing material $c_{bulk}$, and the linear-in-the-parameters electrode equation constants, $k_1$, $k_2$, $k_3$, and $k_4$.

Parameter Determination

To most easily discuss the model parameter determination approach, it will be applied to a specific cell. However, it is believed that this model is equally applicable to other types of batteries and/or cells. In any event, the cell chosen is the NSWC Crane Pack ID 3602G. It is rated at 65 AHr, and uses 31% KOH concentration, and is maintained at 10 degrees C. The charge-discharge profile is a square wave, with 35% depth-of-discharge (DOD) and 104% recharge ratio. The square wave current is 26.29 A for 54 minutes charging, and −37.92 A for 36 minutes during discharge. Note that 65 AHr=3900 AMin, 35% of 65 AHr=1365.1 AMin=26.29 A*54 Min, 3900 AMin−1365.1 AMin=2534.9 AMin, and 104% of 1365.1 AMin=1419.7 AMin=37.92 A*36 Min.

The self-discharge resistance is determined by the recharge ratio of 104%. It is assumed that roughly half of the extra 4% goes into self-discharge, and that the other 2% goes into overcharge reactions. The division of the excess could be determined more accurately using the Buder method, but that has not been done at this time. Assuming no current in or out, it is assumed that 2% of the stored material (1.3, AHr=78 AMin) is lost during each 90 Min cycle via self discharge. Using this in the known solution to Equation (27)

$$c_s(t) = c_s(0)e^{-t/R_{sd}} \quad (30)$$

gives $$c_s(t) = 3900 - 78 = 3900 e^{-90/R_{sd}}. \quad (31)$$

Solving this for the self-discharge resistance gives $R_{sd}$=4455 ohms. This value was later modified after the simulation was implemented to force the constant-plus-taper charging to give a final charge of 3900 AMin. The modified value of the self-discharge resistance that is used in the charging studies is $R_{sd}$=4024 ohms, or equivalently $1/R_{sd}$=0.0002485.

To determine q and $k_d$ for the diffusive material, it is observed that most $NiH_2$ cells are diffusion limited. This must be true, since the terminal voltages get small after only 35% of the active stored material is used. To start, it is assumed that the bulk concentration is unity, $$c_{bulk} = 1. \quad (32)$$

Thus we will assume that the diffusive material goes from unity concentration to roughly zero concentration as 35% of the stored material is used. With a constant current of −37.92 A, the solution to the diffusing material equation using Laplace transforms is $$c_d(s) = \frac{1}{s} + \frac{k_d}{s^q}\frac{(-37.92)}{s}. \quad (33)$$

The time response obtained by inverse transforming this is $$c_d(t) = 1 - 37.92 k_d t^q. \quad (34)$$

To determine the unknown constants, we will evaluate this at the end of discharge, or t=36 Min, at which point the concentration goes to roughly zero, $$1 - 37.92 k_d(36)^q = 0,$$

or $$37.92 k_d(36)^q = 1. \quad (35)$$

Taking the natural logarithm of both sides and rearranging gives $$-\ln(37.92) = q\ln(36) + \ln(k_d) \quad (36)$$

This gives one equation for our two unknowns. If we now assume that the charging occurs similarly, we can obtain another equation. This is not exactly true, since the diffusive material will recover on its own, with no driving current, but this recovery is somewhat slower than the forced recovery. We will thus ignore the associated initialization response during the charging phase. Thus, charging at 26.29 A for 54 Min yields the equation $$-\ln(26.29) = q\ln(54) + \ln(k_d) \quad (37)$$

These two equations can now be solved for the two unknowns, which become q=0.9034 and $k_d$=0.001036.

To implement the diffusion term, an approximation to the fractional operator is necessary. The resulting approximation is $$k_d s^{-0.9034} = 0.001036 \frac{0.0192s^2 + 1.1444s + 0.3455}{s^2 + 0.5078s + 0.0013} \tag{38}$$

which is designed with a maximum Bode magnitude response error of 2 dB between $\omega=10^{-3}$ and $\omega=10^{+2}$. Better approximations containing more terms, or simpler approximations containing fewer terms are easily generated using the method. Again it should be noted that the initialization terms have been ignored.

The parameters in the electrode equation are obtained by using a batch least squares optimization on the charge/discharge data from the actual cell. The resulting equation is $$v = 1.3656 + 0.0265 \ln(1+|i|)\text{sgn}(i) + 0.0229 \ln(c_d - 0.0262 \ln((1.005*3900 - c_s)/3900) \tag{39}$$

Notice that the last term has been rescaled so that $c_s$ can go to the AHr capacity of the battery, which is 3900 AMin.

Model Verification Studies

Figure 5:
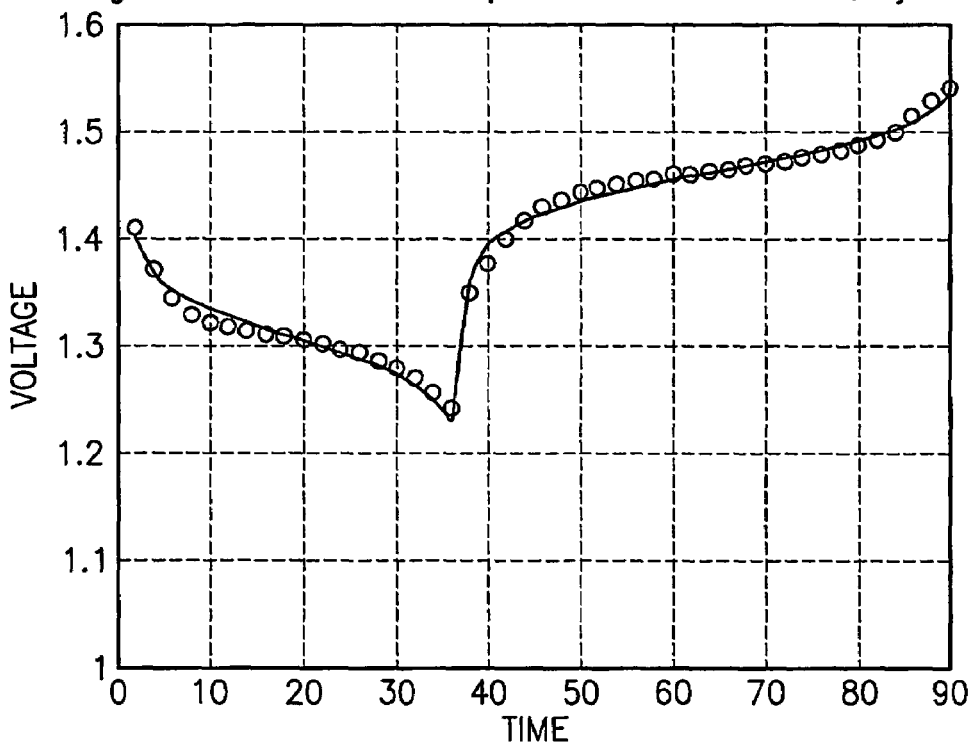
FIG. 5 is a graphical representation of the charge-discharge cycle for the $500^{th}$ cycle of the cell according to the present invention.
Figure 6:
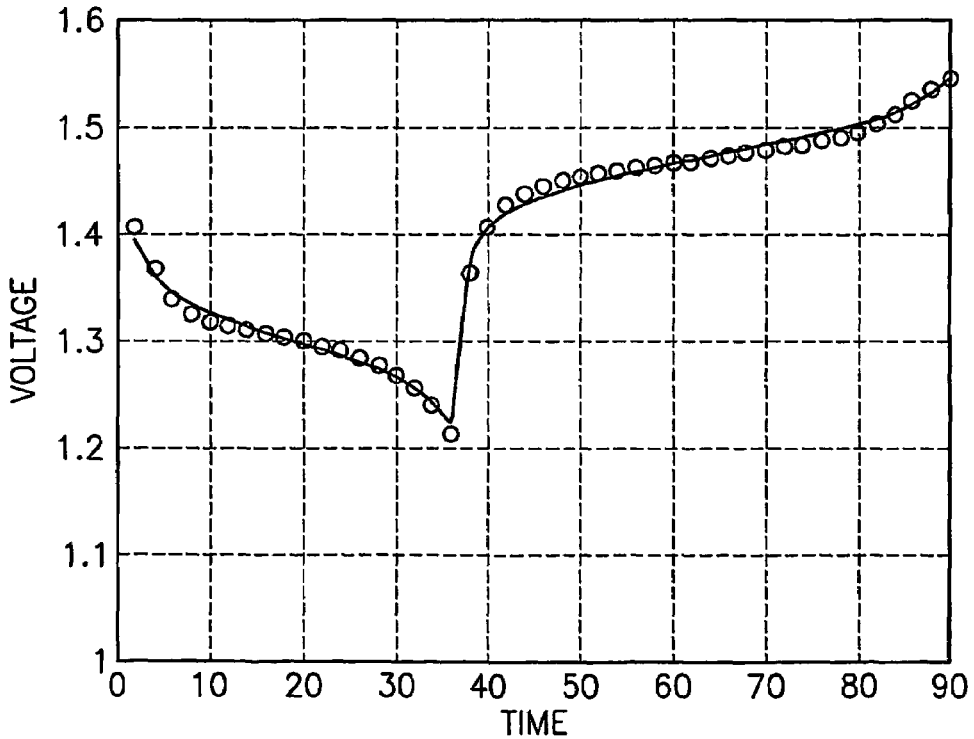
FIG. 6 is a graphical representation of the charge-discharge cycle for the $10000^{th}$ cycle of the cell according to the present invention.
Figure 7:
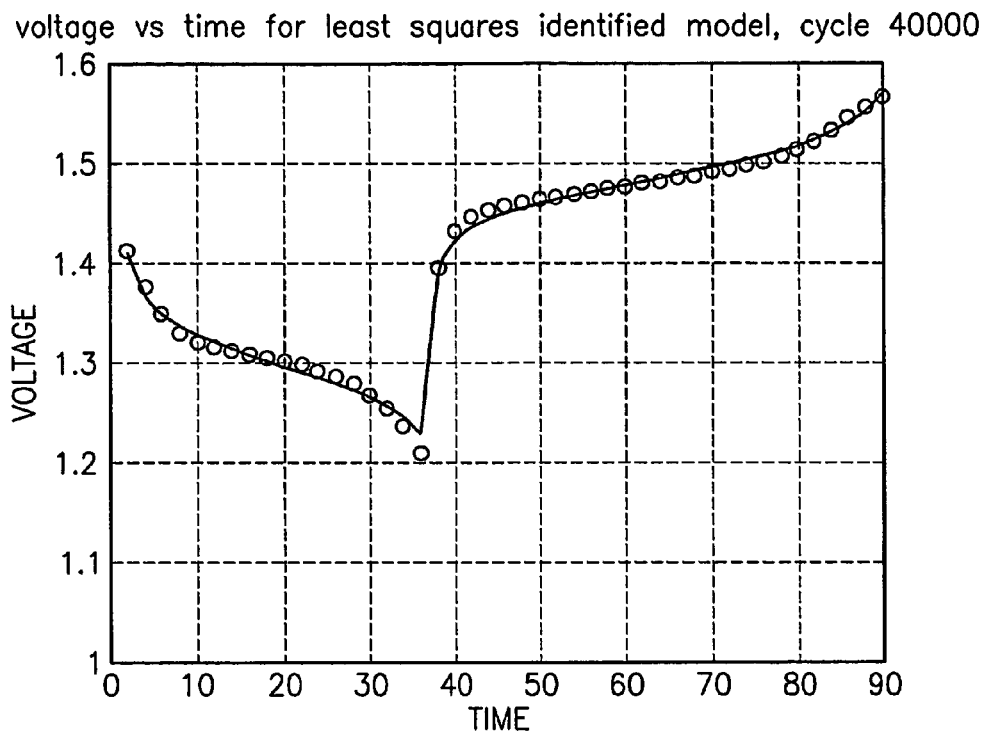
FIG. 7 is a graphical representation of the charge-discharge cycle for the $40000^{th}$ cycle of the cell according to the present invention.

FIGS. 5, 6, and 7 show actual charge-discharge data (the 'o' points) from the cell discussed above. These figures also contain the charge-discharge plot (solid line) from the identified model also discussed above. The three plots are chosen at 500 cycles, 10000 cycles, and 40000 cycles respectively to shown how the specific cell has changed with time, and to show the ability of the model to track changes in the cell.

Damage Modeling in $NiH_2$ Batteries

Background

If the real-time observer is going to be able to provide information concerning the state of cell health, some understanding of the damage process in an electrochemical cell is necessary. There is no known instantaneous damage rate model for electrochemical systems, however, fatigue and creep damage modeling has been used for damage mitigating control in aerospace propulsion systems. In that application, damage per cycle information has been used, as well as a continuum damage model developed. The continuum damage model predicts the current damage rate as a function of local stress and strain, and can be used to implement a controller that trades a small amount of performance (dynamic response) for large gains in system lifetime. A continuum damage model will be required for work with batteries and fuel cells.

For electrochemical cells and batteries, a number of damage mechanisms have been identified which include: corrosion, electrolyte communication between cells, separator dry out, popping damage, plaque expansion and electrochemical degradation. Still other mechanisms may be present which have not yet been identified. However it still remains to quantify these mechanisms, determine their importance to a particular design, and to determine the operational relationships to damage accumulation. As these effects are quantified, the resulting relationships can be used to refine battery damage prediction. The next two sections discuss in a general way the mechanisms that may be responsible for battery cyclic damage.

Damage Mechanisms for $NiH_2$ Batteries

There are many ways to damage any cell. The most significant damage mechanisms for $NiH_2$ cells will be evaluated.

A. Formation of $\gamma$-phase NiOOH:

At the positive nickel electrode, the charged material is NiOOH, and the discharged material is $Ni(OH)_2$. As in many solids, however, these compounds can exists in difference solid phases. The normal charge-discharge cycling occurs between the beta phases,

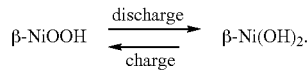

On overcharge, however, the excess heating due to $O_2$ formation along with any large currents, causes the $\beta$-NiOOH to undergo a phase change into the $\gamma$-phase. $\gamma$-NiOOH possesses two properties of interest to our studies. One is that it generates a lower voltage with respect to the KOH electrolyte, roughly 1V and opposed to 1.5V for $\beta$-NiOOH. The other physical property is that the spaces between the molecules are much larger for $\gamma$-NiOOH than for $\beta$-NiOOH. Thus the formation of $\gamma$-NiOOH can physically damage a cell stack due to the changing size associated with the phase change. Additionally, as the amount of $\gamma$-NiOOH builds up, the usable charge storage capacity of the cell goes down, as the $\gamma$-NiOOH cannot provide the voltage necessary for the electrical loads.

Figure 8:
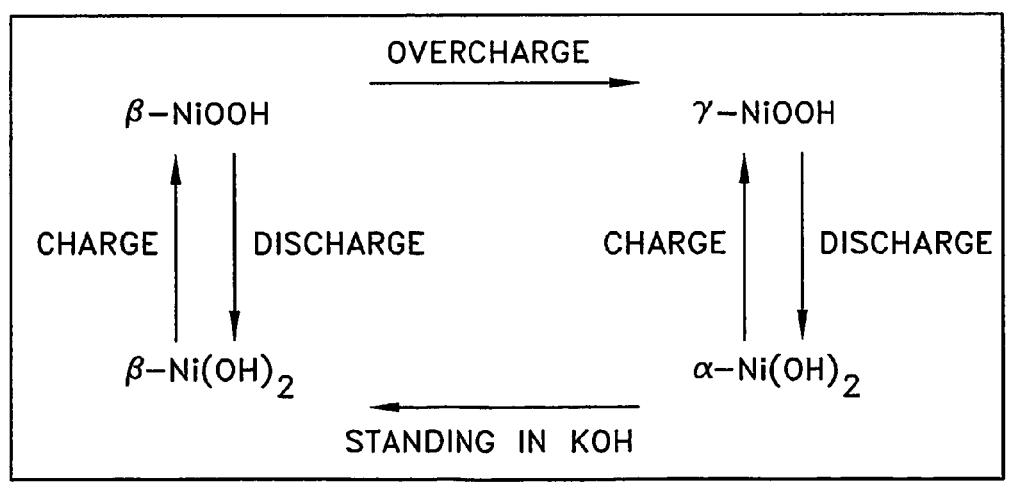
FIG. 8 is a schematic diagram of the solid phase relationships for an NiOOH electrode.

Cells with a build-up of $\gamma$-NiOOH can be reconditioned using the reaction mechanism proposed by Bode. This is shown in FIG. 8. It should be observed that the $\gamma$-NiOOH will cycle electrically with $\alpha$-$Ni(OH)_2$. The original $\beta$-$Ni(OH)_2$ can be recovered by allowing the cell to stand for an extended period of time in a KOH solution.

B. Formation of $O_2$:

Overcharging a cell can occur by either continuing to charge the cell after all the $\beta$-$Ni(OH)_2$ has been converted to $\beta$-NiOOH, or when the charging current is so large that the $\beta$-$Ni(OH)_2$ cannot react fast enough to form $\beta$-NiOOH. In either case, the excess current goes into the electrolysis of the cell electrolyte. The effect of this is the formation of $O_2$ at the nickel electrode, along with heating. The problem is further complicated by the formation of oxygen in a hydrogen rich environment. These can recombine chemically and release significant heat. This recombination can also do physical damage to the electrode. This chemical recombination of oxygen and hydrogen is often called popping. Clearly, overcharging is to be avoided.

C. Heating:

Heating is another major problem in $NiH_2$ batteries. As discussed above, it results in the formation of $\gamma$-NiOOH, which reduces cell capacity and does physical damage to the cell. Another problem with heating is the increase in self-discharge reaction rates, which can also be manifested as a reduction in cell capacity. Any excess heat production must be avoided.

Thermal Analysis and Hysteresis

This section will discuss the gross energy balances taking place in an electrochemical reaction. One needs to consider the free energy of the reaction, $$\Delta G = \Delta H - T\Delta S. \tag{40}$$

Here $\Delta G$ is the Gibbs free energy of the reaction and represents the energy available for external work, and in electrochemical cells is effectively the source of the terminal voltage. $\Delta H$ is the enthalpy of the reaction and represents to total chemical energy change during the reaction. The $T\Delta S$ term is the temperature multiplied by the entropy change of the reaction. The entropy change involves the reordering of the reacting molecules as they undergo chemical reaction. Multiplying the entropy change by the temperature of the reactants, $T\Delta S$, gives the heat released or absorbed during the reaction. If the free energy is negative, the reaction will be spontaneous.

Dividing the above equation by $-nF$, where n is the number of electrons involved in the reaction and F is Faraday's constant, gives $$-\frac{\Delta G}{nF} = -\frac{\Delta H}{nF} + \frac{T\Delta S}{nF}. \tag{41}$$

The sign convention of a spontaneous reaction giving a positive voltage in an electrochemical cell then gives $$\Delta G = -nFv. \tag{42}$$

Using this in the energy equation yields $$v = v_{TN} + \frac{T\Delta S}{nF}, \tag{43}$$

Here $$\Delta H = -nFv_{TN} \tag{44}$$

is the thermoneutral voltage, or the voltage of the electrode reaction when there is no heat being generated. Although free energies, entropies, and enthalpies are all generally dependent on the concentrations of reactants, the enthalpy of reaction for many electrochemical reactions is roughly constant. This allows the thermoneutral voltage to be used as a measure of when there is heating at the reaction site by comparing it with the actual terminal voltage.

The energy flow in the reaction can be obtained by multiplying the above equation by the current, $$iv = iv_{TN} + i\frac{T\Delta S}{nF}, \text{ or} \tag{45}$$

$$iv = iv_{TN} + Q_r. \tag{46}$$

Here $Q_r$ is the rate of heat release or absorption at the reaction site, and represents the unavailable electrical power. This equation can be rearranged to give $$Q_r = i(v - v_{TN}) \tag{47}$$

which shows that comparing the terminal voltage with the thermoneutral voltage allows determination of the heating due to the electrochemical reaction.

The above analysis has only considered the energy related to the electrochemical reaction, and has not considered any of the electrical behavior elsewhere in the overall cell, particularly any electrical losses. Whenever current flows in a conductor, there are electrical losses due to the heating of the material. In this case, the total Ohmic resistance as the primary electrical heating source will be used. As such, Equation (43) can be written as $$v = v_{TN} + \frac{T\Delta S}{nF} + iR_{Ohmic}. \tag{48}$$

This shows that the terminal voltage varies not only with the free energy of the reaction, but also with the resistive loss in the cell. Multiplying this equation by the current gives $$iv = iv_{TN} + i\frac{T\Delta S}{nF} + i^2 R_{Ohmic}. \tag{49}$$

This equation can be expressed in words as:

electrical power=electrical power of the reaction+ reaction heating/cooling+electrical heating.

Thus the overall heating is a combination of electrical and chemical effects.

The energy flow can be further generalized, by including the energy that goes into oxygen production during overcharge. Equation (49) is generalized adding this electrolyzing current, $$iv = (i - i_{O2})v_{TN} + (i - i_{O2})\frac{T\Delta S}{nF} + i_{O2}(v - iR_{Ohmic}) + i^2 R_{Ohmic}. \tag{50}$$

In words, this says:

electrical power in=electrical power into the reaction+ reaction heating/cooling+heating due to $O_2$ production+electrical heating.

Figure 9:
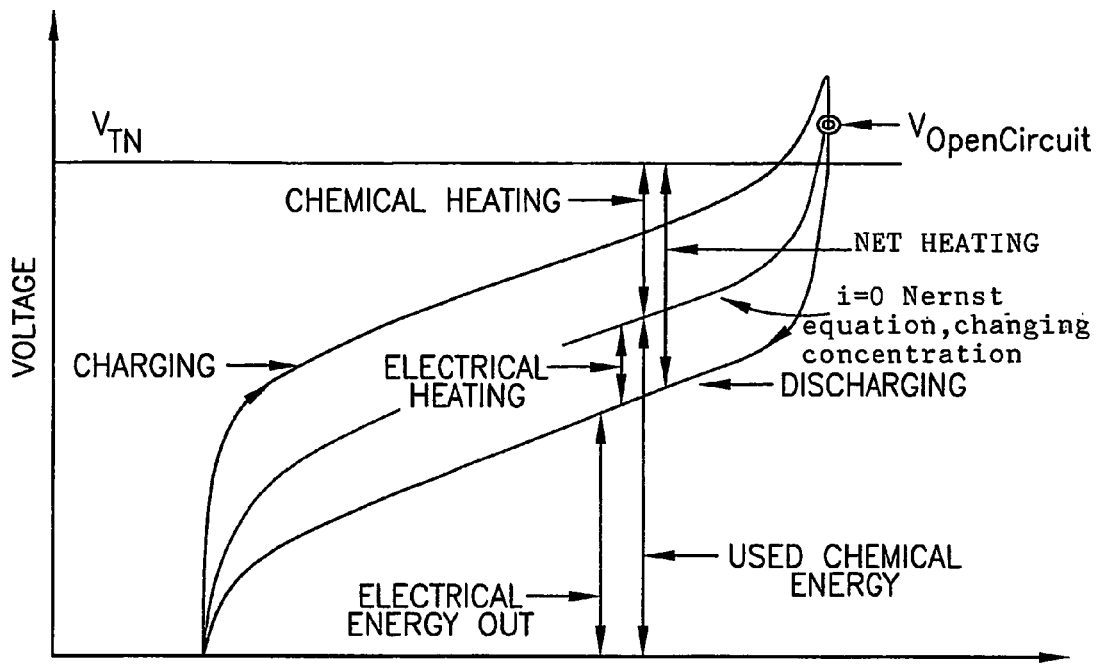
FIG. 9 is a graphical representation of the energy distribution during the discharging portion of a typical charge-discharge cycle.
Figure 10:
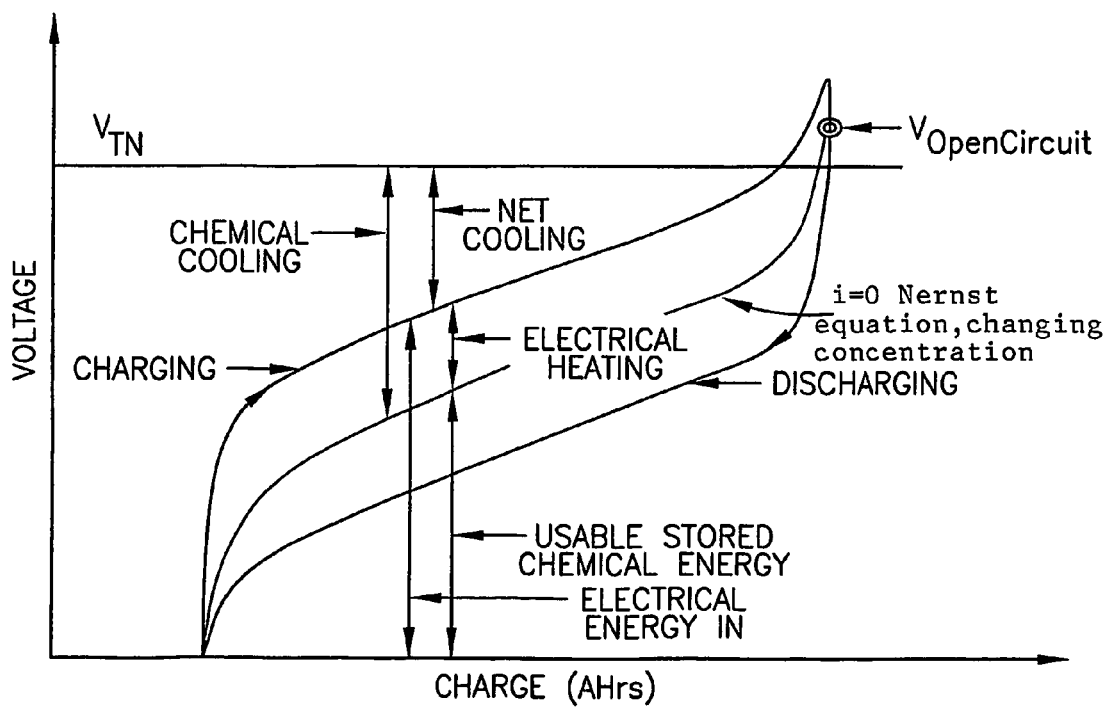
FIG. 10 is a graphical representation of the energy distribution during the charging portion of a typical charge-discharge cycle.
Figure 13A:
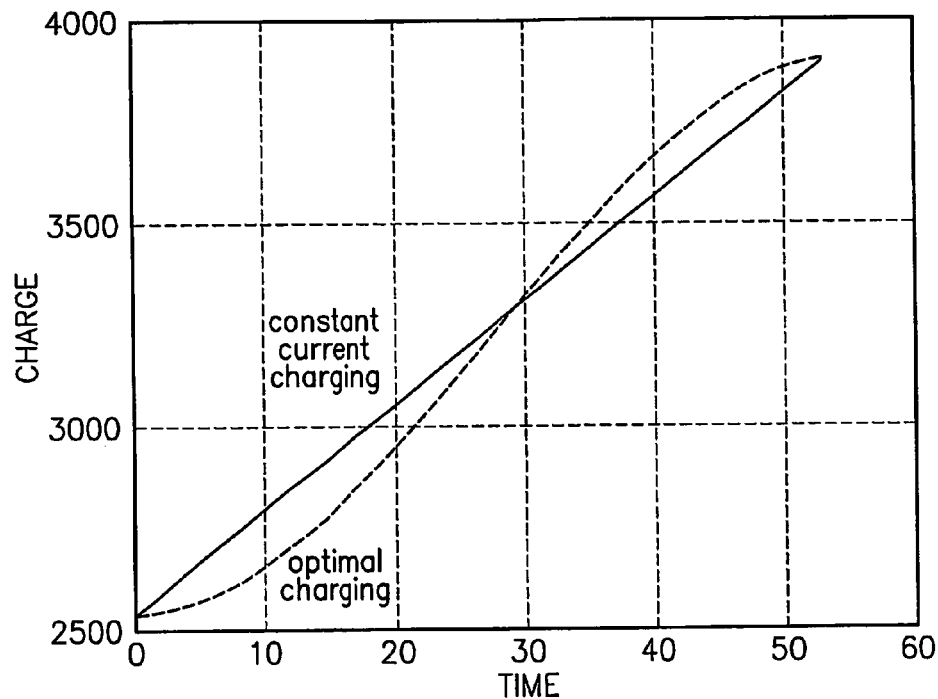
Figure 13B:
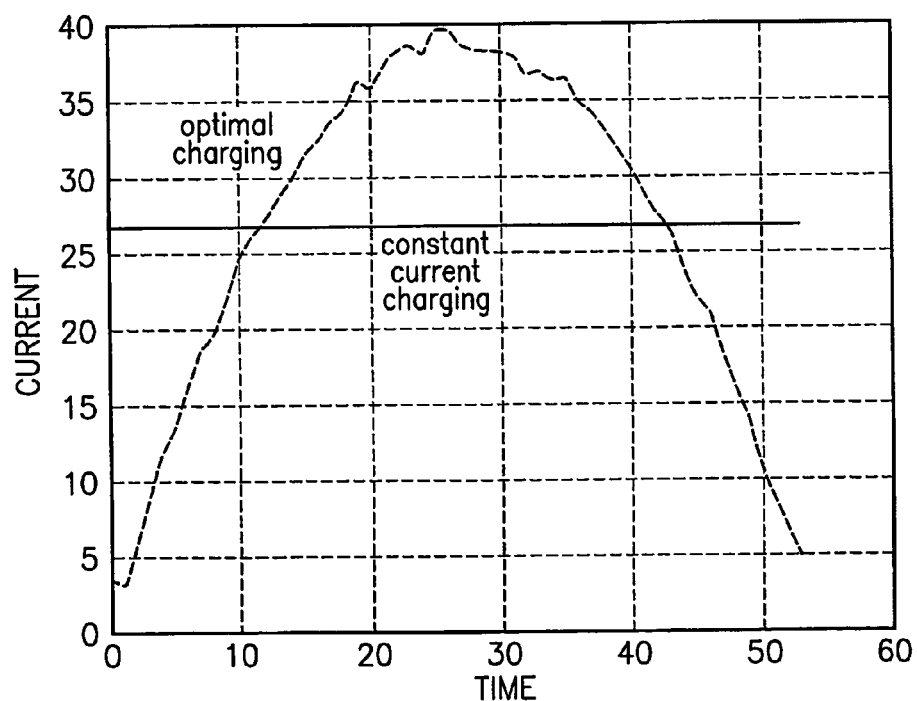
Figure 13C:
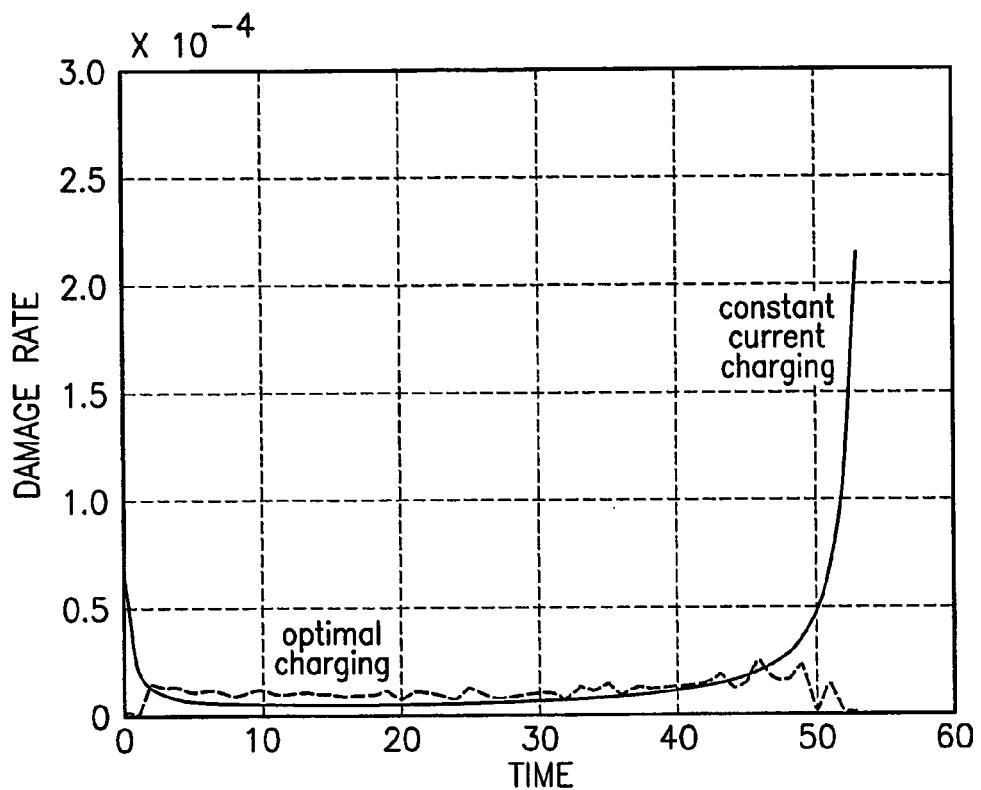
Figure 13D:
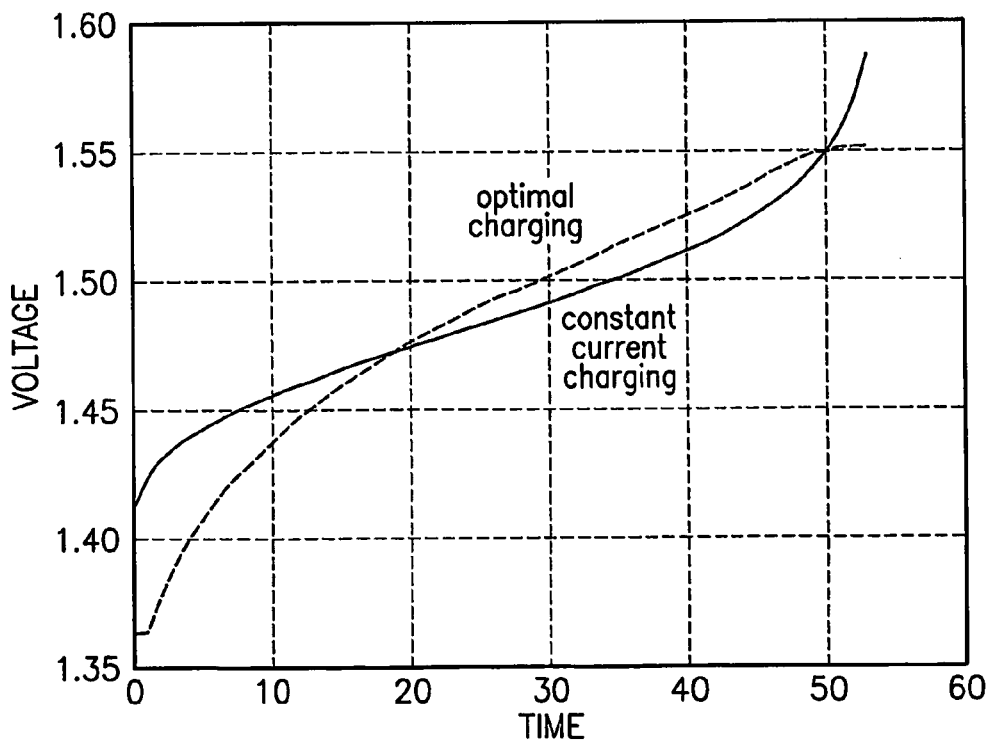
Figure 15B:
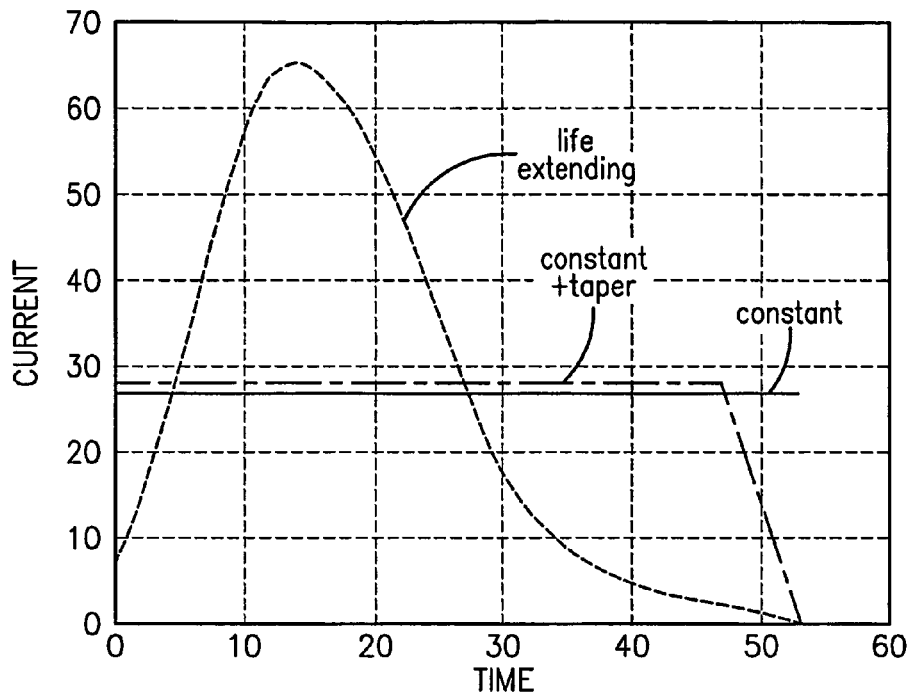
Figure 15C:
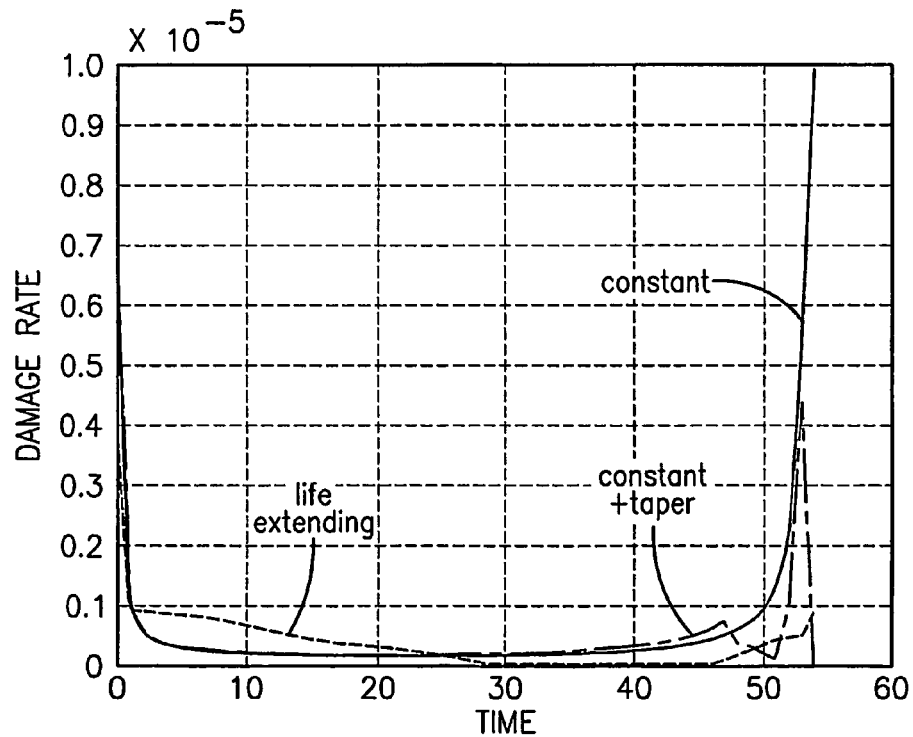
Figure 15D:
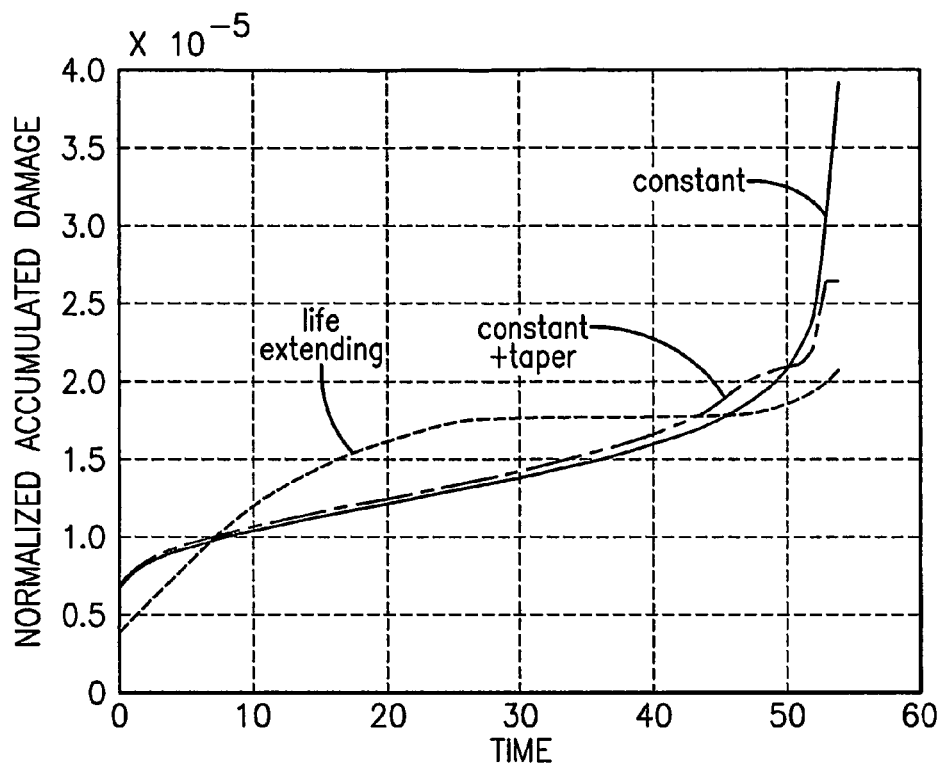
Figure 15E:
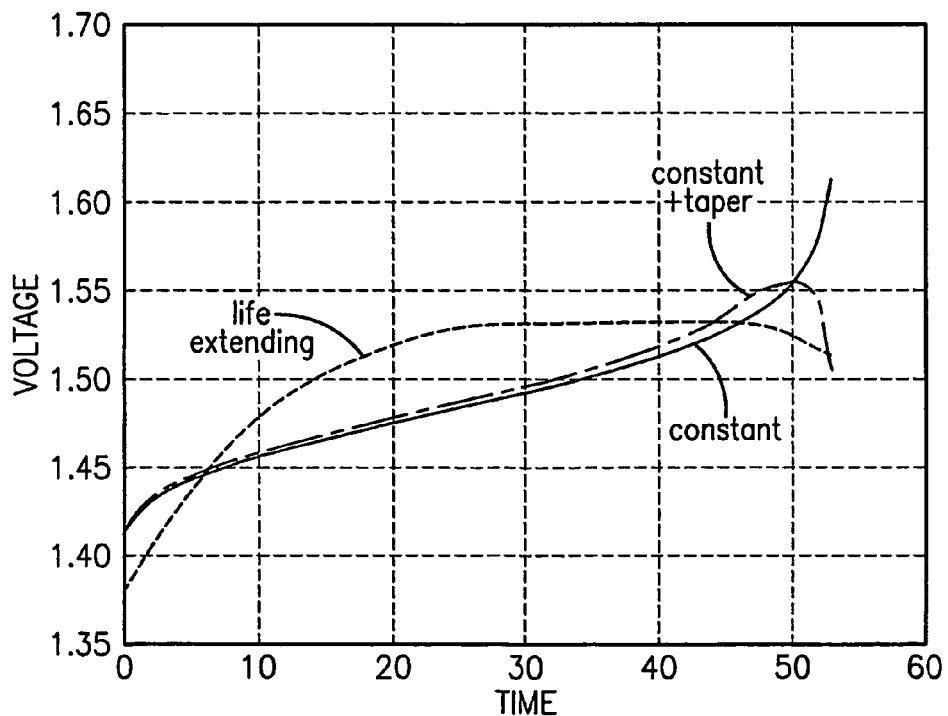
Figure 15F:
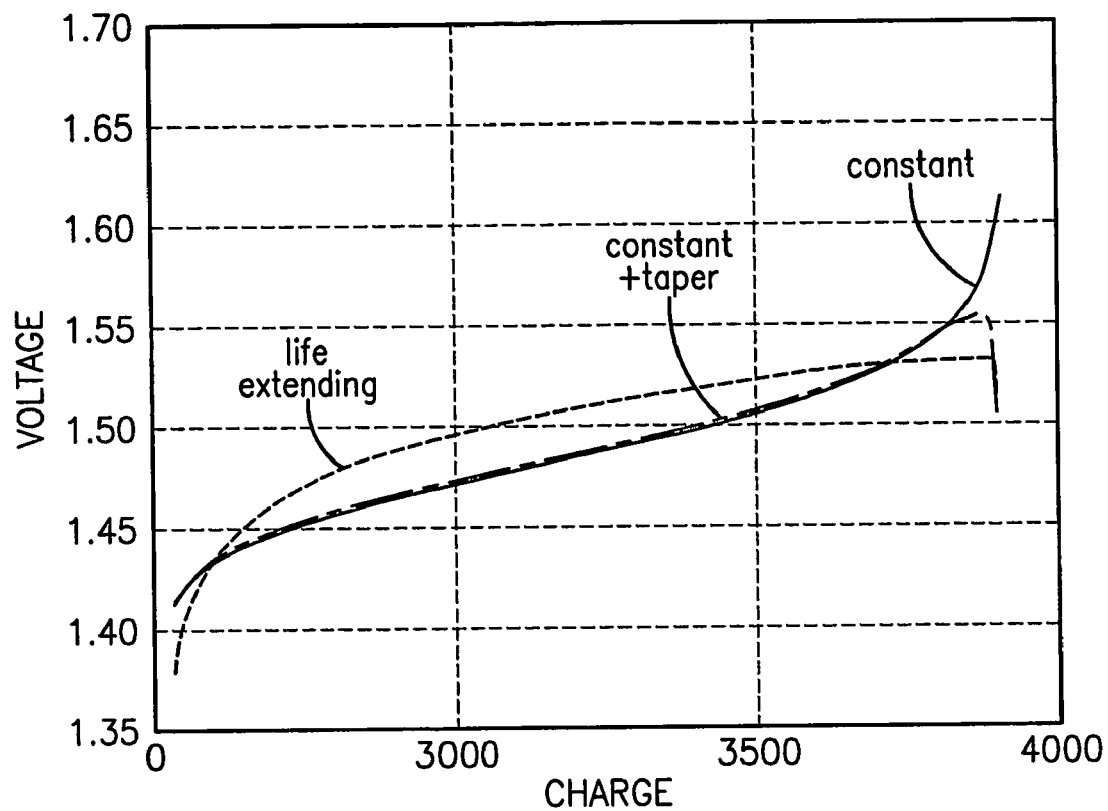
Figure 16A:
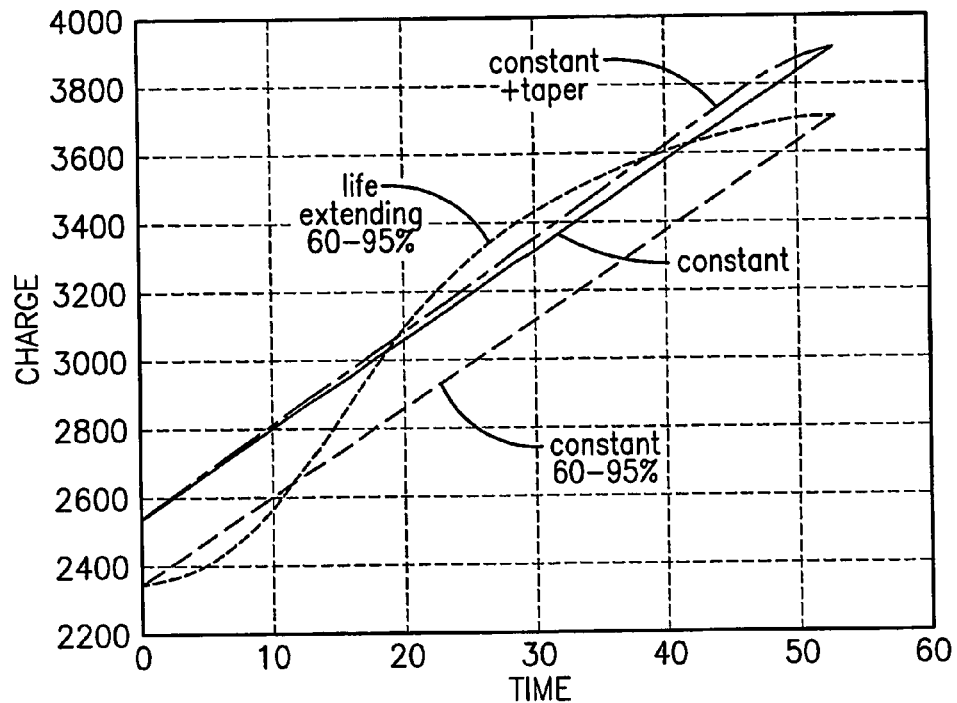
Figure 16B:
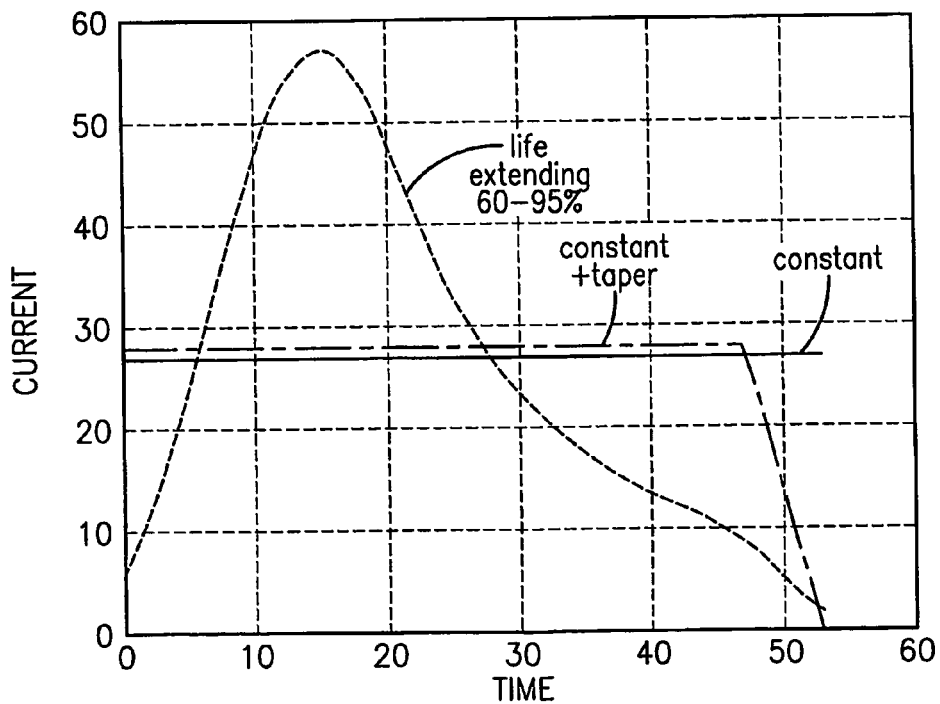
Figure 16C:
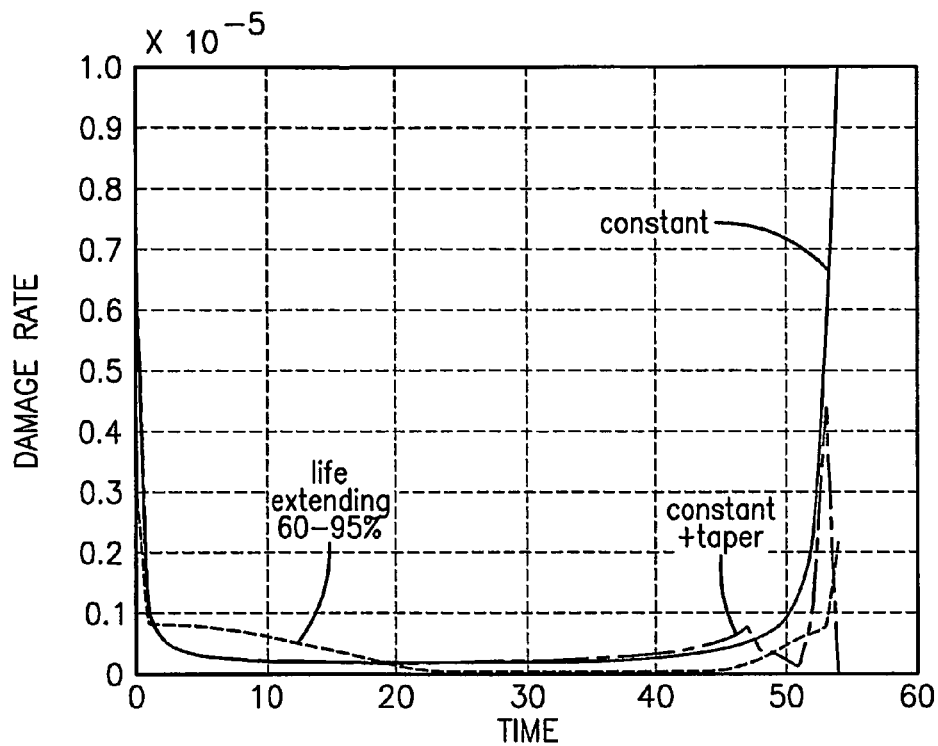
Figure 16D:
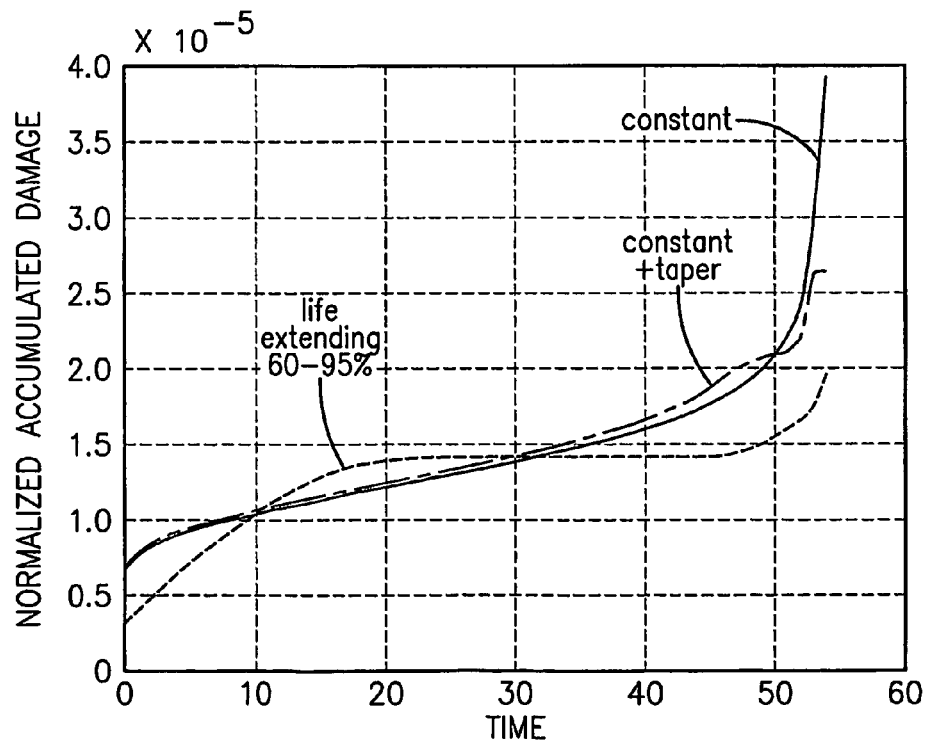
Figure 16E:
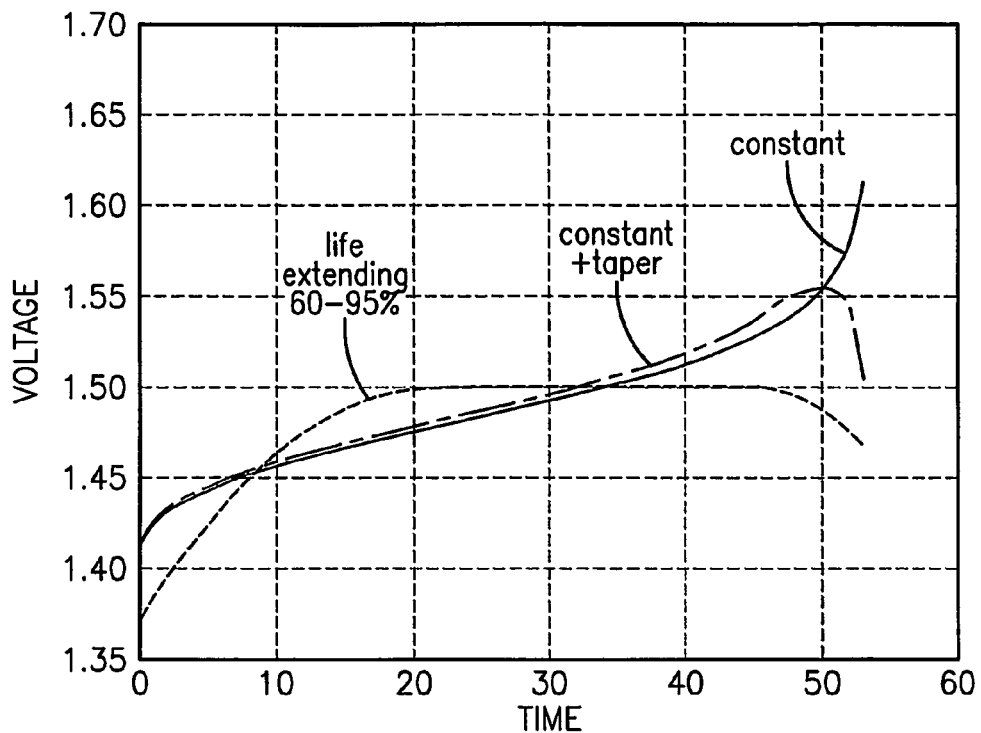
Figure 16F:
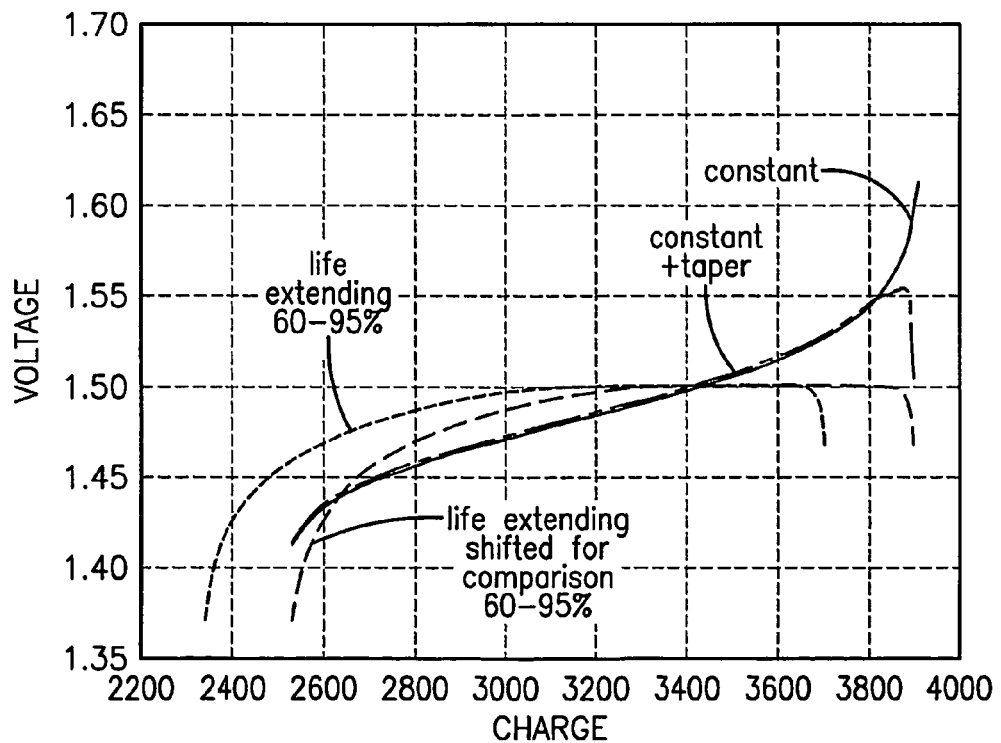
Figure 17A:
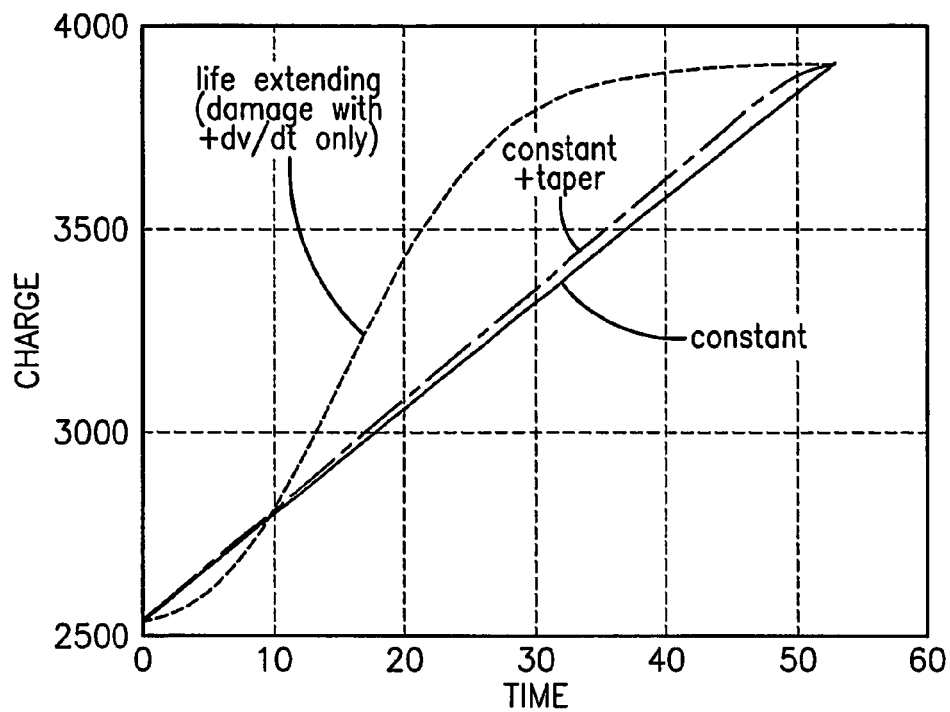
Figure 17B:
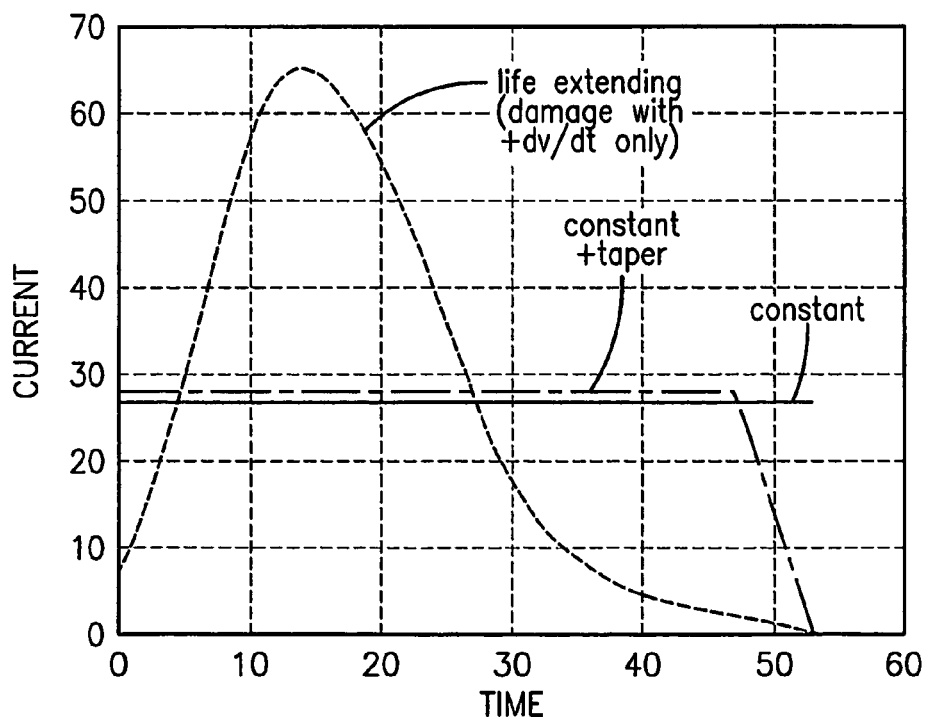
Figure 17C:
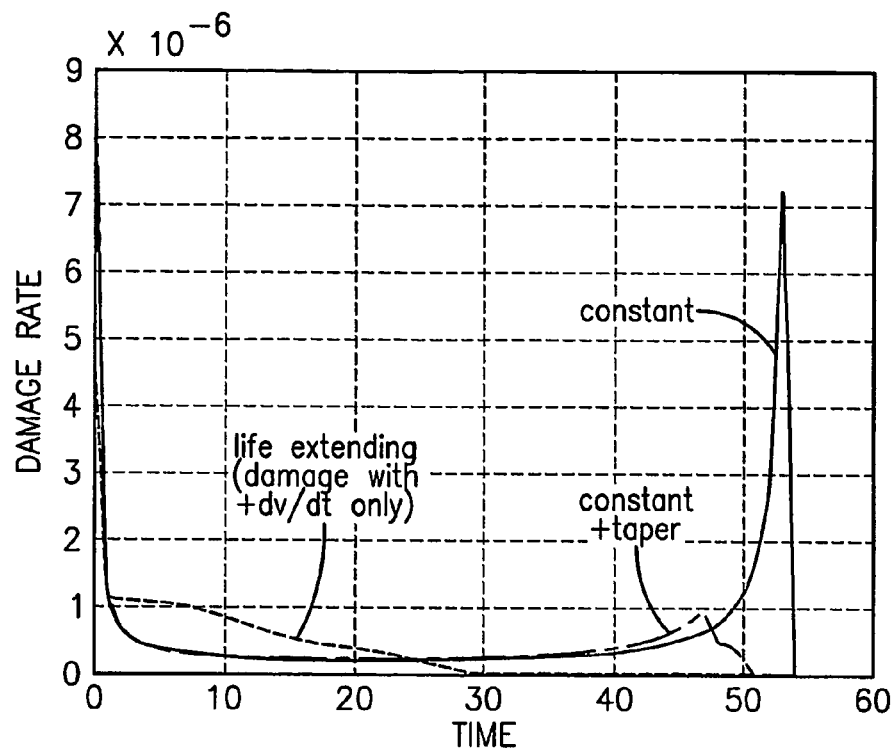
Figure 17D:
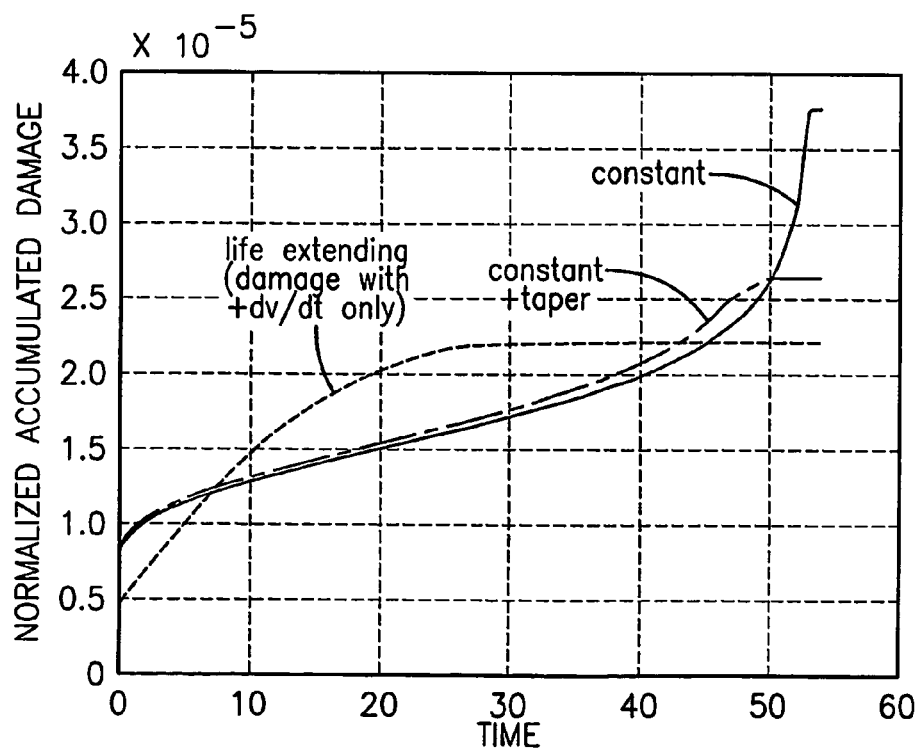
Figure 17E:
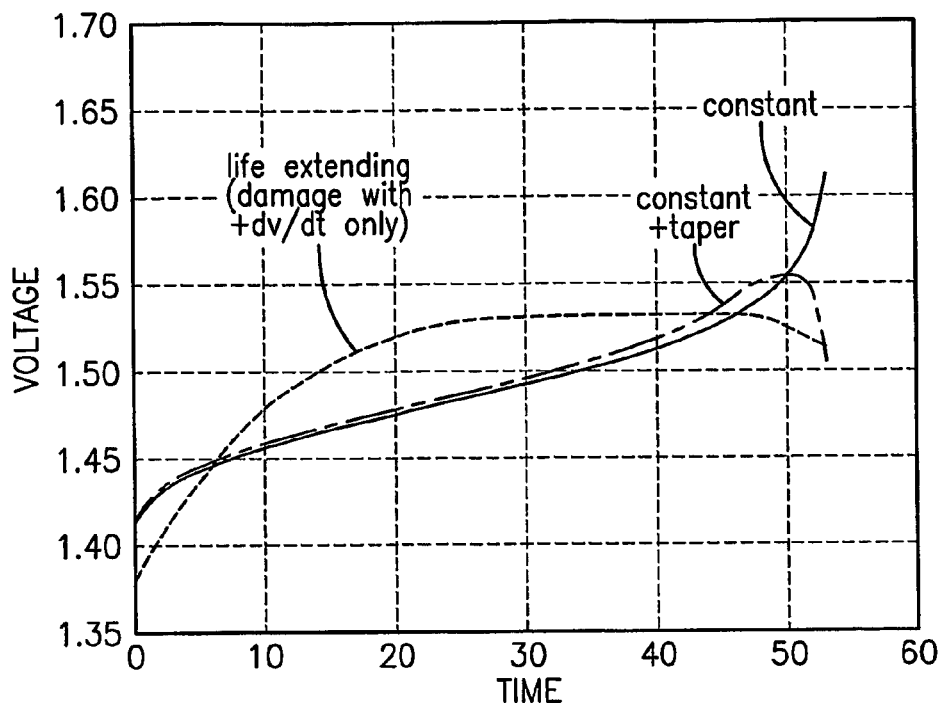
Figure 17F:
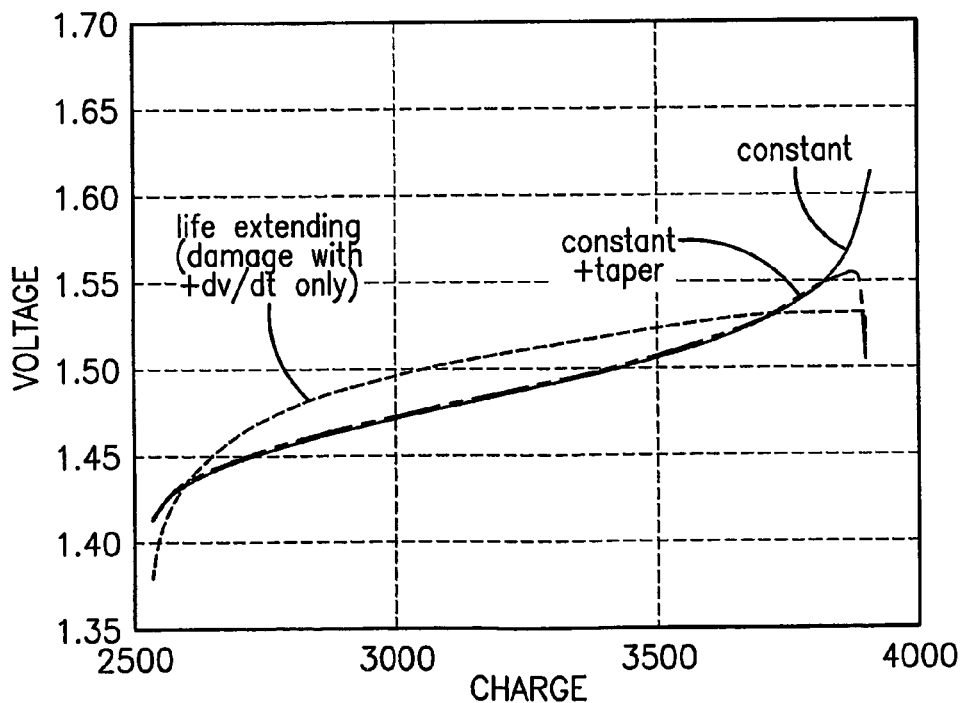

The discussion of this section can be summarized in FIGS. 9 and 10 which show charge-discharge curves on a v-q diagram, along with the associated energy distribution as described by Equation (49). These diagrams are somewhat ideal in the sense that they do not have self-discharge or overcharge effects included. In the case of overcharge, the figure would need to be modified to reflect the current going to the oxygen production as described in Equation (50). Another important effect that is not considered in these figures, or the discussion above, is that the voltage can move up or down as the diffusing material relaxes (independent of the stored charge). Since only the stored charge is plotted on the horizontal axis, the figures do not take the concentration of diffusing material into effect.

At this point, sufficient data does not exist to quantify these effects for a particular battery design. Thus, based on available cycle life vs depth of discharge data an empirical continuum damage model for cells based on external variables, such as voltage and current, and internal variable such as species concentrations has been developed. It may be possible to explicitly include other internal variables, such as pressure and temperature in the future. This damage model allows the development of an instantaneous damage rate sensor and a damage mitigating control for $NiH_2$ cells which is discussed in the next section.

Battery Continuum Damage Modeling

This section develops methods for using battery cyclic life data to infer instantaneous damage rate within the battery. This instantaneous damage rate is required to design optimum charging profiles and to establish control algorithms. Cycle life as a function of depth of discharge (DOD) data for $NiH_2$ cells is given for a temperature of 10 degrees C., as follows

| DOD | Cycles To Failure |
|---|---|
| 35% | 38,000 |
| 50% | 19,000 |

For this data, a charge/discharge cycle has a 90-minute period, with a 54 minute charging duration. The recharge ratio is always less than 110%, and the recharge current was constant until 94% recharge at which point a taper charge was used to finish the charging. The cycle life data is reproduced in FIG. 11. In this figure, only two data points are available at 10 degrees C. Four curves have been fit to the data, the Green-Hoffman model, a modified Green-Hoffman model discussed later, a power law, and a linear curve. Although only the two Green-Hoffman approaches are considered, any curve can be fit through two points.

The Green-Hoffman approach uses the following exponential model $$N_{fGH} = 1885.04 \, e^{4.621(1-DOD)}, \text{ at } 10°\text{ C}. \tag{51}$$

where $N_f$ is the number of cycles to failure. It is assumed that when the total accumulated damage becomes equal to one, the cell has failed. Otherwise stated, the total accumulated damage is normalized to one. Further assuming that the damage per cycle is constant for a given DOD, or more specifically, that the damage per cycle does not increase as the accumulated damage increases, then the damage per cycle is $$D_{cyc} = 0.0005305 e^{-4.621(1-DOD)} = \frac{1}{N_{fGH}}. \tag{52}$$

Based on similar previous studies of mechanical fatigue, an expression for the instantaneous damage, $\dot{D}(t)$, is derived based on the particular cycle life model. This is possible because the cycle life data implicitly contains all the information about how heating, overcharge, high current, and other hard to model factors damage a cell. The cyclic damage model expressed by Equations (51) and (52) characterizes the damage hysteresis cycle size by DOD, which is actually representative of the charge amplitude of the cycle. The hysteresis cycle size could just as well be characterized by the voltage amplitude of the cycle. The purpose of the models to be derived here is to optimize the charging current profile. Models based on DOD as characterizing the size of the damage cycle are thus not useful because the overall charge to be stored during charging is always the same, no matter what charging profile is used. An alternative and more appropriate descriptor of cycle size for damage modeling is the voltage amplitude of the cycle. The voltage amplitude referenced to the minimum voltage point of the cycle (i.e. the discharge cutoff voltage (35%)) will be used to describe the damage cycle. The stress variable then will be the voltage difference based on this reference voltage.

For a full charge/discharge cycle, the voltage amplitude $v_a$ varies with DOD (charge amplitude). This relationship is certainly a nonlinear function, but we will use a linear approximation. We express this as $$DOD = c_1 v_a. \tag{53}$$

To obtain $c_1$, it is adjusted until the simulated damage per cycle for a constant-plus-taper charge is equal to that given by Equation (52) for 35% DOD. This equation is substituted back into the damage per cycle, Equation (52), giving $$D_{cyc} = 0.0005305 \, e^{-4.621 + 4.621 \, c_1 v_a}. \tag{54}$$

Now the accumulated damage as a charge/discharge cycle is traversed is the damage per cycle. Thus the integration of the instantaneous damage through the cycle is $$\int_{cycle} \hat{\delta}(v) \, dv = D_{cyc} = 0.0005305 e^{-4.621 + 4.621 c_1 v_a}. \tag{55}$$

where $\hat{\delta}(.)$ is the voltage referred damage rate, that is $$\hat{\delta}(v) = \frac{dD}{dv}. \tag{56}$$

It is now assumed that all of the damage is accumulated over the charging part of the cycle, that is the "uphill" part of the process, then $$\int_{v_{min}}^{v_{max}} \hat{\delta}(v) \, dv = D_{cyc} \tag{57}$$

$$= 0.0005305 e^{-4.621 + 4.621 c_1 v_a}$$

$$= 5.222 \times 10^{-6} e^{4.621 c_1 v_a}.$$

It is noted that models including damage on the discharging portion of the cycle are readily possible using techniques similar to those used here. Changing the limits of integration gives $$\int_{0}^{v_{max}-v_{min}} \hat{\delta}(v + v_{min}) \, dv = 0.0005305 e^{-4.621 + 4.621 c_1 v_a} \tag{58}$$

$$= 5.222 \times 10^{-6} e^{4.621 c_1 v_a}.$$

Since $v_a = v_{max} - v_{min}$. One can now infer an approximation to the shifted voltage referred damage rate, $\hat{\delta}(v + v_{min})$, as $$\hat{\delta}(v + v_{min}) \cong 0.0005305 e^{-4.621} 4.621 c_1 e^{4.621 c_1 v} \tag{59}$$

The reason that this is approximate is due to the fact that at cyclic amplitude of DOD=$v_a$=0, the Green-Hoffman model does not yield zero cyclic-damage, as we require. In fact, as discussed above, zero amplitude would actually allow healing. Then Equation (59) becomes $$\hat{\delta}(v) = 2.4129 \times 10^{-5} c_1 e^{4.621 c_1 (v - v_{min})}. \tag{60}$$

This result in Equation (52) gives $$\int_{v_{min}}^{v_{max}} \hat{\delta}(v) \, dv = 5.222 \times 10^{-6} (e^{4.621 c_1 v_a} - 1) \tag{61}$$

$$\cong 5.222 \times 10^{-6} e^{4.621 c_1 v_a}.$$

Once the voltage referred damage rate is obtained, the instantaneous damage rate can be obtained by simple application of the chain rule $$\dot{D}(t) \equiv \frac{dD}{dt} = \frac{dD}{dv} \frac{dv}{dt} = \hat{\delta}(v(t)) \dot{v}(t). \tag{62}$$

The model requires that damage, D(t), be a monotonically increasing function, that is, the model will be conservative in that, healing of the battery will not be not allowed. Therefore the instantaneous damage rate is required to always be positive, thus Equation (62) is modified to $$\dot{D}(t) \equiv \frac{dD}{dt} = \frac{dD}{dv}\left|\frac{dv}{dt}\right| = \hat{\delta}(v(t))|\dot{v}(t)|. \quad (63)$$

Substituting the voltage referred damage rate into this equation gives the instantaneous damage rate as $$\dot{D}(t) = 5.222 \times 10^{-6} c_1 e^{4.621 c_1 (v - v_{min})} |\dot{v}(t)|. \quad (64)$$

Choosing $v_{min}=1.2V$, gives at last $$\dot{D}(t) = 5.222 \times 10^{-6} c_1 e^{4.621 c_1 (v - 1.2)} |\dot{v}(t)|. \quad (65)$$

This is the continuum damage model based on the Green-Hoffman cyclic damage model.

Modified Damage Model

The Green-Hoffman exponential model, Equations (51) and (52), implies that cyclic damage occurs when the depth of discharge is zero. This is not physically plausible for an operational battery damage model. The degradation that occurs during shelf storage is not the same as cyclic damage. Thus, the Green-Hoffman model is modified so that cyclic damage goes to zero as depth of discharge goes to zero. For the model to allow zero damage at zero DOD it is required that the cyclic damage have the form $$D_{cyc} = c_2(e^{c_3 DOD} - e^{c_3 0}) = c_2(e^{c_3 DOD} - 1) = \frac{1}{N_f} \quad (66)$$

The constants $c_2$ and $c_3$ are determined numerically to best fit the data presented in the table at the beginning of this section. This process yields the damage per cycle as $$D_{cyc} = 1.0404 \times 10^{-5}(e^{3.602 DOD} - 1) = \frac{1}{N_f}. \quad (67)$$

For DOD=35%, then this equation gives $D_{cyc}=2.6316\times10^{-5}$. To get the instantaneous damage, a linear relationship between DOD (the charge amplitude) and cyclic amplitude of voltage deviation is assumed, $$DOD = c_1 v_a. \quad (68)$$

To obtain $c_1$, it is adjusted until the simulated damage per cycle for a constant-plus-taper charge is equal to that given by Equation (67) for 35% DOD. Finding $c_1$ must wait until the end of the process however. This equation can be substituted back into the damage per cycle $$D_{cyc} = 1.0404 \times 10^{-5}(e^{3.602 c_1 v_a} - 1) \quad (69)$$

Then, the integral of voltage referred damage rate, $\hat{\delta}(v)$, for one charging cycle must be equal to the damage per cycle, and assuming damage formation only during the during the charging phase of the cycle $$\int_{v_{min}}^{v_{max}} \hat{\delta}(v) dv = D_{cyc} = 1.0404 \times 10^{-5}(e^{3.602 c_1 v_a} - 1). \quad (70)$$

where $$\hat{\delta}(v) = \frac{dD}{dv} \quad (71)$$

is the voltage referred damage rate and D(t) is the accumulated damage. Changing the limits of integration of Equation (70) gives $$\int_0^{v_{max}-v_{min}} \hat{\delta}(v + v_{min}) dv = \int_0^{v_a} \hat{\delta}(v + v_{min}) dv \quad (72)$$
$$= 1.0404 \times 10^{-5}(e^{3.602 c_1 v_a} - 1).$$

The shifted voltage referred damage rate $\hat{\delta}(v+v_{min})$ is now determined to be $$\hat{\delta}(v+v_{min}) = 1.0404 \times 10^{-5}(3.602\ c_1) e^{3.602 c_1 v} \quad (73)$$

or $$\hat{\delta}(v) = 3.7475 \times 10^{-4} c_1 e^{3.602\ c_1 (v - v_{min})}, \quad v > v_{min}. \quad (74)$$

This voltage referred damage rate exactly satisfies Equation (70). Having the voltage referred damage rate, the instantaneous damage rate can again be obtained by application of the chain rule $$\dot{D}(t) \equiv \frac{dD}{dt} = \frac{dD}{dv}\left|\frac{dv}{dt}\right| = \hat{\delta}(v(t))\dot{v}(t). \quad (75)$$

Further requiring that the instantaneous damage rate is always positive gives $$\dot{D}(t) \equiv \frac{dD}{dt} = \frac{dD}{dv}\left|\frac{dv}{dt}\right| = \hat{\delta}(v(t))|\dot{v}(t)|. \quad (76)$$

Substituting the incremental damage rate into this equation gives the instantaneous damage rate as $$\dot{D}(t) = 3.7475 \times 10^{-4} c_1 e^{3.602\ c_1(v - v_{min})} |\dot{v}(t)|. \quad (77)$$

Choosing $v_{min}=1.2V$, gives $$\dot{D}(t) = 3.7475 \times 10^{-4} c_1 e^{3.602\ c_1(v - 1.2)} |\dot{v}(t)|. \quad (78)$$

Now, adjusting $c_1$ until the simulated damage per cycle for a constant-plus-taper charge is equal to that given by Equation (67) for 35% DOD, that is $D_{cyc}=2.6316\times10^{-5}$, yields $c_1=0.9707$.

It should be noted that the instantaneous damage rate could also be expressed as a function of the current and rate of change of voltage with charge by continued application of the chain rule, $$\dot{D}(t) \equiv \frac{dD}{dt} = \frac{dD}{dv}\left|\frac{dv}{dq}\right|\left|\frac{dq}{dt}\right| = \delta(v(t))\left|\frac{dv}{dq}\right||i(t)|. \quad (79)$$

Here $dv/dq$ is the slope of the charging curve on the v-q diagram.

In deriving Equation (76), it is required that the instantaneous damage rate always be positive. This was accomplished by using the absolute value of the voltage rate. This is justifiable in that whenever the voltage rate becomes large positive or negative, there are significant microscale changes taking place in the cell. An alternative result would be to have the damage rate go to zero whenever the voltage rate goes negative. This is justifiable in that the cell may not be undergoing damage when it is relaxing, that is, when the voltage rate is negative. Accordingly, the damage rate in this case becomes $$\dot{D}(t) = 3.7475 \times 10^{-4} c_1 e^{3.602 c_1 (v-1.2)} \dot{v}(t), \dot{v}(t) \geq 0$$

$$\dot{D}(t) = 0, \dot{v}(t) < 0 \quad (80)$$

In this case, the constant $c_1 = 1.0901$.

From the various forms for the damage, Equations (75)-(80), it can be seen that changing voltage is indicative of damage in the cell. The rate of change of voltage is an indication that the chemical reactions are proceeding in a manner to cause damage on a microscopic level. Thus keeping the voltage from changing abruptly should allow longer life in these cells. This would seem to indicate that a "soft take-off" and a "soft landing" are important in the charging process to avoid damaging the cell. Looking back at the energy balance equations with or without $O_2$ production, Equations (49) or (50) give the following expression for the voltage rate $$\dot{v}(t) = \frac{1}{nF} \frac{d(T(t)\Delta S(t))}{dt} + R_{Ohmic} \frac{di(t)}{dt}. \quad (81)$$

In words this equation says:

changing terminal voltage∝changing heat of reaction+ changing heating due to current, that is, the heating rate is intrinsically tied to the damage process. Stated differently, or on a microscopic scale, the equation indicates changing terminal voltage∝changing microscopic reordering rate+changing material flow rate.

This is because the current is proportional to the concentration as indicated by Equations (9) and (10). Both of these processes involve the rate of change of material, that is, material motion and acceleration, which would be related to internal damage rate. This would seem to infer that damage rate and internal loss rates are related, thus justifying the use of voltage-difference rate as the continuum damage rate model stress variable.

Now that an instantaneous damage rate model is available, one can use it to construct an instantaneous damage rate sensor and then to design an optimal charging profile that minimizes the accumulated damage per cycle.

Effect of Damage in the Essentialized Model

This section discusses the incorporation of the accumulated damage into the dynamic performance model. First it is important to associate the accumulated damage with some physical mechanism. The accumulated damage will be associated with the inability to store charge, or to accumulate the stored material. Thus this could be associated with the formation of the γ-phase NiOOH, which actually does reduce the possible total stored charge. Likewise, overcharging always causes heating, which leads to the formation of γ-phase NiOOH. Consequently, the accumulated damage will be associated with a reduction in the ability to accumulate the stored material.

The inability to store charge could potentially be manifested into all of the parts of the performance model; Faraday's Law, the electrode equation (or the linear-in-the-parameters form), the charge storage term, the diffusion term, or the self-discharge. As the damage can often be associated with a reduction in the ability to accumulate the stored material, a focus on incorporating the damage into the charge storage term will be considered. Equation (27) becomes stored material with self-discharge and damage:

$$\dot{c}_s(t) = i(t) - \frac{1}{R_{sd}} c_s(t) - \dot{D}(t). \quad (82)$$

But, as we have used the linear-in-the-parameters electrode equation, it must also be modified to indicate a loss of capacity. Thus Equation (29) becomes electrode equation with damage:

$$v = k_1 + k_2 \ln(1+|i|)\text{sgn}(i) + k_3 \ln(c_d) + k_4 \ln((1-D(t))-c_s) \quad (83)$$

It will be appreciated that damage can be incorporated into the essentialized model in other ways, as is required by the specific device.

Damage Mitigating Control

Control Philosophy

Control system design is usually separated into at least two phases. Phase one is the design of optimal trajectories and associated inputs, that move a given plant from one operating condition to another, while minimizing some performance measure. This subject is the topic of the present section and the next Phase two is the design of a trajectory following controller (sometimes called a regulator or tracker) that provides a real-time control input perturbation to keep the plant operating near the designed optimal trajectory. This is discussed in the summary section.

The preferred control philosophy is to charge the $NiH_2$ cell in such a way that the damage incurred during the charging period is minimized, thus extending its cycle life. This is generally considered damage mitigating control or life-extending control. We will call the optimal charging profile life-extending charge. A damage mitigating control for use during discharge could also be considered, but the required discharge current was dependent on time-varying mission needs, and would require hardware modifications that were considered outside the scope of this research. Some discussion of possible damage mitigating strategies for discharge is also included in the summary section.

Performance Measure

The performance measure to be minimized is the accumulated damage per recharge cycle. This can be obtained by integrating instantaneous damage rate with respect to time:

$$J = \int_0^{t_f} \dot{D}(t)\,dt, \quad (84)$$

where $\dot{D}(t)$ is the instantaneous damage rate which is obtained from either of the damage models or the damage rate sensor, Equations (65) or (78), and $t_f$ for our problem is 54 Min. As it is, this performance measure can be minimized by using zero current, which does not recharge the cell. Thus, the performance measure must contain some information on the total charge required during charging. This is easily incorporated into a final state weighting term:

$$J = w_{fs}(c_s^*(t_f) - c_s(t_f))^2 + \int_0^{t_f} \dot{D}(t)\,dt, \quad (85)$$

where $c_s^*(t_f)$ is the desired stored charge at the end of charge ($\leqq 1$), $w_{fs}$ is the cost weighting associated with the error in stored charge at the end of charge, and again $\dot{D}(t)$ is the instantaneous damage rate which is obtained from either of the damage models or the damage rate sensor, Equations (65), (78), or (80), and $t_f$ for our problem is 54 Min. Note that only one weighting term is necessary as it can be either greater or less than unity, but is constrained to be positive. In the implementation, the self-discharge resistance is chosen to have a value which forces the final charge using constant-plus-taper charge (104% of 1420 AMin) to have a value of 3900 AMin. The optimizer forces the life-extending charge to also have this final value. The constant charge (also 104% of 1420 AMin) will have a final charge larger than this since the self-discharge current is slightly less than the constant-plus-taper.

Original Optimization Approach

To determine the optimal charging profile, or life-extending charge, that minimizes the performance measure, Equation (85), a numerical optimization approach is used. The algorithm used is outlined in FIG. 12. Some typical charging results are shown in FIGS. 13 A-D.

Charging Profile Design for Specific Battery

The optimization originally was accomplished by sampling the charging current in time, and optimizing each little sample increment. This optimization approach is very slow and requires many hours of computation time. The results shown in the last section, however, seemed to indicate that the optimal charging profile was similar to a parabola. Using this idea allows a much faster optimization to be accomplished, although the results are probably a little conservative as the truly optimal currents at each point in time are not being calculated. The fast optimization approach is outlined in FIG. 14. Here a ten point cubic spline is chosen to represent the current profile so as to allow some variation from a parabola (other time functions were also considered which gave similar results). Charging profiles are shown in the next several plots. In performing the optimization, it has been important to be sure to include the cost of requiring the zeroing of a non-zero current at the end of charging, as the large voltage rate there may incur significant damage. Also notice the constant current charge is predicted to last for only 25465 cycles, while the actual cell is still cycling after 50000 cycles. It is believed that this indicates either some problem with the cycle life data, or that this particular cell has used a design different from that of the cycle life data.

Recognizing that the cell voltage response is diffusion limited on discharge, along with the knowledge that much of the damage occurs near the end of charge when most of the overcharge occurs, allows one to try a charge-discharge profile that backs off from the 100% charged point Said otherwise, the life-extending charge profile from 60% to 95% fully charged can be determined. On discharge, the cell will still use 35% of the AHr capacity since it is diffusion limited at cutoff. On charge, the cell will be kept away from the overcharging region, and thus reduce the damage per cycle. The resulting life-extending control will be implementable in real-time due to the use of an on-board dynamic observer which can keep track of the stored charge material. The use of a real-time observer is discussed in the next section.

The expected improvement associated with the life-extending charge is summarized in Tables I, II, and III which show a significant potential extension in life expectancy. The percentage life increase should be regarded as approximate due to the use of the fast optimizer and relatively large simulation timestep. It is interesting that the optimal solution using the |dv/dt| term in the damage rate model (Table I and FIGS. 15A-F), gives the same optimal charging curve as incurring damage only when dv/dt is positive (Table III and FIGS. 17A-F), although the actual cycle life is different because of different damage rate models.

TABLE I

Life-extending charge compared to constant current and constant current + taper.

| | | | Life-extending-Charge | | |
| --- | --- | --- | --- | --- | --- |
| | Damage per Cycle | Cycles to Failure | Damage per 65-100% Cycle | Cycles to Failure | % Life Extension |
| Constant – Current Charge | 3.9269e–005 | 25465 | 2.0780e–005 | 48123 | 88.98% |
| Constant + Taper Charge | 2.6316e–005 | 38000 | 2.0780e–005 | 48123 | 26.64% |

TABLE II

60%-95% Life-extending charge compared to constant current and constant current + taper.

| | | | Life-extending-Charge | | |
|---|---|---|---|---|---|
| | Damage per Cycle | Cycles to Failure | Damage per 60-95% Cycle | Cycles to Failure | % Life Extension |
| Constant – Current Charge | 3.9269e–005 | 25465 | 1.9535e–005 | 51190 | 101.02% |
| Constant + Taper Charge | 2.6316e–005 | 38000 | 1.9535e–005 | 51190 | 34.71% |

TABLE III

Life-extending charge compared to constant current and constant current + taper using only positive dv/dt in the damage rate law..

| | | | Life-extending-Charge | | |
|---|---|---|---|---|---|
| | Damage per Cycle | Cycles to Failure | Damage per 65-100% Cycle | Cycles to Failure | % Life Extension |
| Constant – Current Charge | 3.9269e–005 | 25465 | 2.2080e–005 | 45290 | 77.85% |
| Constant + Taper Charge | 2.6316e–005 | 38000 | 2.2080e–005 | 45290 | 19.18% |

Suggested Real-Time Implementation

Real-Time Observers

An important result of state space control theory is the concept of a state observer. The total number of dynamic "states," or "state variables," in a system is equal to the number of energy storage elements in the system, which is also equivalent to the number of time derivatives that are needed in the differential equations representing that system. The "state" of a given system is the collection of all the "state variables" of that system at a given point in time. This collection is all the information needed to advance the "state variables" forward in time through the differential equations representing the system. With these definitions, the concept of a state observer will now be clarified.

A state observer is effectively a dynamic model of a given system that runs in real-time, and in parallel with the actual system. Typically, only a small number of the dynamic states of an actual system are measurable, or are sensed. In the case of an electrochemical cell, typically only terminal voltages and currents, and perhaps some pressures and temperatures are all that are sensed. The state observer is then used to provide an estimate of the non-sensed variables. There are usually two forms for state observers, the open-loop observer and the closed-loop observer.

An open-loop observer receives the same inputs as the actual system, and then provides the collection of dynamic states as an output. If the model being used in the observer is accurate, then all the dynamic states from the observer will accurately represent the true states in the actual system. This has been applied successfully to jet engines, as well as other places. A closed-loop observer receives the same inputs as the actual system, as well as all of the sensed dynamic states and outputs from the actual system. Comparing these sensed variables with the corresponding simulated variables, the difference can be used as a feedback signal to force the observer dynamic states to converge to the true dynamic states of the actual system (see FIG. 2). This approach does not require the model to be as accurate as in the open-loop observer due the correction of the feedback from the sensed variables. Closed-loop observers are used in most state space control designs, where they have also been used to filter noise out of the measurements.

Figure 18:
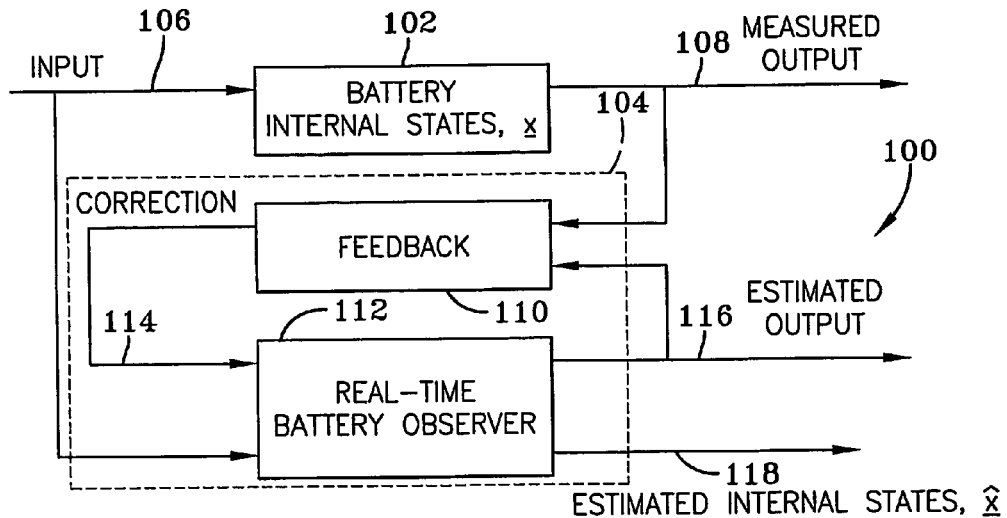
FIG. 18 is a schematic diagram of a real-time observer structure.

An optimal controller for an electrochemical cell as shown in FIG. 18 is designated generally by the numeral 100 and incorporates the hybrid cell model, as discussed previously, into a microprocessor based simulation that is run in real-time. Sensed variables from an actual cell 102, which could be any rechargeable battery device, are input to a simulation microprocessor 104. The internal states of an exemplary cell, include, but are not limited to normal charge-discharge operation, and overcharge reactions. These internal states were previously discussed and are embodied in Equations 1-6. The processor 104 receives inputs such as voltage, current, temperature, and any other quantifiable state variable in the form of an input signal 106, as well as known system parameters such as charge storage properties of the cell, the diffusive behavior of the cell, charge transfer resistance, capacitance, self-discharge resistance, and the like. Likewise, a measured output signal 108 representing the comparable state variables mentioned above are generated by the cell 102. Both the input signal 106 and the output signal 108 are received by the microprocessor 104. As appreciated by the skilled artisan, the microprocessor incorporated into the microprocessor 104 contains the necessary hardware, software and memory for implementing the teachings of the present invention.

The microprocessor 104 includes a feedback component 110 and a real-time observer component 112. Generally, the sensor 104 forces the dynamic states of the real-time cell observer 112 (simulation) to converge to the corresponding states in the actual cell 102. The feedback component 110 is crucial for this problem as the actual system is highly nonlinear as well as spatially distributed, and the model dynamic states represent aggregations of many actual states. Even so, the feedback to the observer will force the errors in the measured variables to zero, and the unmeasured variables will accurately represent the corresponding actual variables. The equations associated with the feedback process can be set out as New states estimates=old state estimates+Gain×Error signal.

And a similar equation holds for the parameter identification

New system parameters=Old state system parameters+Gain×Error signal.

These equations are updated every sample time in the microprocessor 104. The equations have also been developed for fractional-order system components. Equations 27 and 30-37 are exemplary of the processes implemented by the feedback component 110. In particular, the feedback component generates a correction signal 114 that represents a real-time estimate of the amount of damage being done to the cell during re-charging.

The correction is received by the real-time observer component 112 which also receives the input signal 106. With these inputs an estimated output signal 116 is generated and returned to the feedback component 110 for converging the dynamic states of the observer component 112 to the corresponding states of the cell 102. As a result, the observer component 112 generates an estimated internal state signal 118. The estimated output signal 116 provides a charging profile that minimizes damage during charging which, in turn, prolongs the life of the cell. It is expected that a real-time observer for an electrochemical cell will be able to provide accurate information about state-of-charge, active species concentrations, and internal temperature and pressure of the actual cell 102. The information included in the state signal 118 provides important information about the behavioral properties of the cell 102 under various charging and discharging conditions. The model structure employed by the observer component is shown in FIG. 4. Equations 26-29 are exemplary of the process implemented by the observer component 112. Any theory required for the fractional-order components in the observer has already been developed. More advanced observer designs may also provide some indication of damage and changing system parameters as discussed below.

Observer Based Control

Typically real-time observers are used in two ways, for continuous-state feedback and for decision making. Much of modern control theory is based on state feedback. State feedback requires knowledge of all the dynamic states of the given system, which are then fed back to the system inputs to improve overall system performance. As most of these dynamic states are not measurable, most state feedback controllers use the estimated states from real-time observers for feedback purposes.

Observers can also be used as part of the general decision making process. To do so, then requires an extra layer of intelligence. For example, if the observer predicts that certain dynamic states have varied too far from where they are supposed to be, the higher level of intelligence can determine if some sensors have failed, if some actuators have failed, or if the actual system has become damaged in some way. Of course, this intelligent layer must be programmed by a knowledgeable user. Another decision making application could be to shut the system down if certain observed dynamic states exceeded those which would normally be deemed acceptable. These decision making control strategies will be addressed later when discussing advanced controllers and life-extending control.

Some of the issues associated with observer based control of batteries and fuel cells require a clear understanding of improved performance. Some potential definitions of improved performance might include maximum energy out, maximum power out, constant voltage out, constant current out, constant power out, prolonging state of health, or minimum damage rate, among others. Other issues are more hardware related. For example, in a collection of cells, control of each cell would probably be important. An array of observers, one for each cell, would then be able to provide information about individual cells. As long as each cell could be independently controlled, this information could actually be used to handle any degradation or failures of individual cells. Of course this also requires the usage of power electronics to control the charging and discharging of individual cells. This could include the use of buck-boost DC-DC converters to provide constant voltages or currents out, as cell voltages and states of charge change. Finally, any theory necessary for control of the fractional order components will be developed.

Advanced Real-Time Observers

Figure 19:
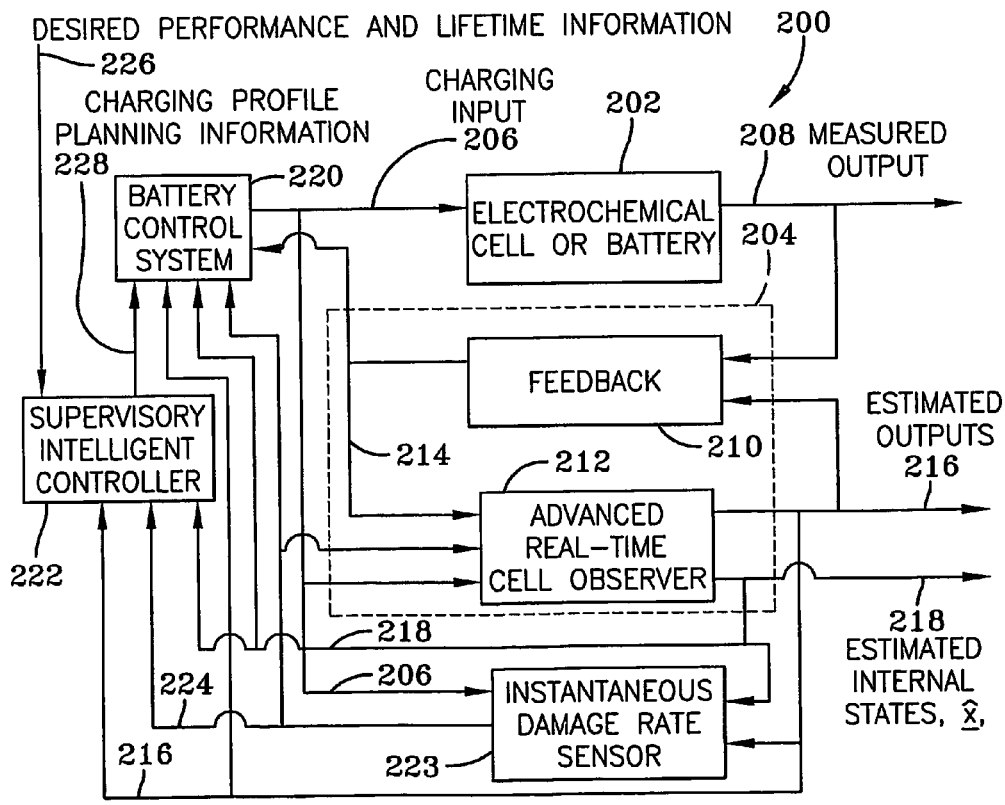
FIG. 19 is a schematic diagram of an advanced control system using an advanced real-time observer.

An advanced optimal controller is designated by the numeral 200 and incorporates many if not all of the same teachings as the system 100. The controller 200 for electrochemical cells, such as shown in FIG. 19, requires an extra level of intelligence over the standard real-time observer system. The system 200 is a microprocessor based system with additional components that facilitate optimal monitoring and re-charging of a galvanic cell. As in the system 100, the system 200 includes an actual cell (or multiple cells) 202. Sensed variables from the cell are input to a simulation microprocessor 204 which receives inputs such as voltage, current, temperature, and an other quantifiable state variables in the form of an input signal 206, as well as known system parameters such as the charge storage properties of the cell, the diffusive behavior of the cell, charge transfer resistance, capacitance, self-discharge resistance and the like. The cell 202 generates a measured output signal 208 that is received by the microprocessor 204 which contains the necessary, hardware, software and memory for implementing the teachings of the present invention.

The microprocessor 204 operates in much the same manner as the microprocessor 104, and includes a feedback component 210 which generates a correction signal 214 that is received by an advanced real-time observer 212. The correction signal 214 contains much the same type of information carried by signal 114 as discussed above. As in the previous embodiment 100, the microprocessor 204 receives the input signal 206 and the output signal 208. The observer 212 generates an estimated output signal 216 which is returned to the feedback component 210, and an estimated internal state signal 218. The observer 212 is distinguishable from the observer 112 in that the cell model parameters contained therein are updated as they change with age in order to provide more accurate real-time estimates of the cell's internal states. In other words, by accurately modeling the internal parameters of the cell at different stages of the cell's lifetime, the observer 212 more closely tracks the performance of the cell to ensure that the re-charging cycle minimizes damage to the cell.

In addition to the added features of the observer 212, the controller 200 includes a battery control system 220, a supervisory intelligent controller (SIC) 222 and an instantaneous damage rate sensor 223. These additional components facilitate the optimal re-charging of the cell 202. The sensor 223 receives the input signal 206, the estimated output signal 216, and the estimated internal state signal 218. From these inputs, the sensor 223 generates a damage rate signal 224 which provides a real-time estimate of the amount of damage being done to the cell 202 during the re-charging process. The sensor 223 implements the teachings embodied at least in Equations 61-65 discussed above. In any event, the damage rate signal 224 is sent to the SIC 222 and the battery charge control 220.

In particular, the SIC 220 receives the damage rate 224, the estimated output signal 216, the estimated internal state signal 218, and a desired performance input signal 226. The signal 226 defines such things as maximum desired power after charging, the time allowed for charging, desired life time performance of the cell and related performance data. These inputs 216, 218, 224 and 226 are processed by the SIC 222 to generate a charging profile signal 228 that is received by the battery charge control 220. The signal 228 effectively uses the desired performance of the cell to modify the input signal 206 generated by the control 220 so as to trade-off performance of cell for the desired purpose of extending the life of the cell. In other words, the battery control system generates the input signal 206 in a manner that is continually updated to provide an optimal charging profile that does the least amount of damage over the life of the cell. The performance measure to be minimized is the accumulated damage per recharge cycle which is exemplified in Equation 85. Accordingly, the algorithm used for the identification of the cell hybrid-model parameters is preferably automated and is expressly set forth in FIG. 12. This allows two things. First, it allows the tracking of parameters as a cell changes during its lifetime. Some knowledge of parameter range could indicate when a cell was nearing failure. Second, it allows the on-line determination of the cell model parameters to begin with, or effectively, the correction of the initial parameters provided to the real-time observer 212. Effectively, the real-time observer 212 could then "learn" any cell. Preferably, the advanced controller 200 also includes models of any damage mechanisms as a function of the system states. And it is believed that degradation algorithms should be included into an observer structure to give a real-time damage indicator for a given cell.

The advanced controller 200 for an electrochemical cell would also require an extra level of intelligence as provided by the SIC 222. Specifically, the advanced controller would use the information provided by the advanced real-time observer 212 to maintain cell performance as the cell's parameters change with time. This would require a continuous change of controller gains as the effect of physical changes in a given cell were updated by the advanced real-time observer.

Secondly, the advanced controller 200 would need to implement some of the decision making skills as discussed earlier in the Observer Based Control section. If the estimates provided by the real-time observer vary too much from the actual cell outputs, then decisions would be required concerning sensor, actuator, or cell health. If any failures were detected, additional intelligence would be required to accommodate a detected failure. Of course, the chosen battery and control structure must allow accommodation.

Finally, assuming some form of a damage model was available through the use of a damage rate sensor, the controller could then make performance-lifetime trade-off decisions. Associated with this intelligence, there may need to be off-line optimization studies performed that determine the most efficient charging (or discharging) profile which will also prolong the cell lifetime. Ultimately, designing a cell charging (or discharging) profile that extends the useful life of the cell by minimizing accumulated damage would be a useful result.

Summary and Further Considerations

Summary

A methodology has been presented for extending the life of $NiH_2$ cells via a damage-mitigating charging current This has required the development of an essentialized dynamic model that will accurately reconstruct internal states in a given cell. The parameters of this model are readily obtainable from either off-line data, or adaptively on-line from real-time data. To determine the life-extending charging current, an instantaneous damage rate model that determines the damage rate at any point in time based on voltage measurements, has been developed. Using the instantaneous damage rate model with the essentialized cell model, allows the development of a damage mitigating charge profile for extending the life of the cell. This charge profile is obtained via optimization, and can be modified by trading recharge for damage. Once the life-extending charge profile has been obtained, the implementation of this profile is performed via a real-time controller that uses a real-time observer for reconstructing the internal cell variables based on current and voltage measurements at the cell terminals. This real-time controller implementation can be used over the entire life of the cell by updating any combination of the model parameters, control parameters, or charging profile based on the data from the present charge-discharge cycle.

Model Development
1. Developed an essentialized $NiH_2$ cell model structure.
2. Developed a method for determine the essentialized model parameters for charge-discharge data.
3. Developed a deeper understanding of the charge-discharge hysteresis behavior in the voltage-charge plane.

Damage Model
1. Developed an instantaneous damage rate sensor for $NiH_2$ cells based on cell voltage measurements.
2. The instantaneous damage rate is shown to depend on voltage and voltage rate.
3. It is shown that the size of the voltage-charge hysteresis curve is related to the damage per cycle.

Life-Extending Charge Development
1. A life-extending charging profile has been developed by optimizing the charging current with respect to the damage per cycle and total recharge.
2. This life-extending current should provide significant life extension over the present recharging methods.
3. Significantly more life extension for a given cell can be obtained by not recharging the cell to 100%.
4. Some heuristic rules for minimum damage charging that have emerged are:
   a. Increase the charging current slowly at the beginning of charge.
   b. Put more of the charge in during the first half of charging.
   c. Decrease the current to zero slowly at the end of charge.
   d. During charge, try not to allow the terminal voltage to increase much beyond the thermoneutral voltage.
   e. Try to keep the voltage-current hysteresis-curve area as small as possible.

Observer Development
1. A fractional-order observer theory (necessary for control implementation of the model) has been developed.

2. A parameter identification technique is discussed for allowing a real-time essentialed model to track changes in its parameters in real-time over the life of a cell.
3. A tracking controller for implementing the optimal charging profile in real-time based on observed system states is discussed.
4. A leaning controller that continuously updates the charging profile based on changing cell parameters has been discussed.

Further Considerations

Overcharge Control

It is noted that $H_2$ pressure seems to be related to overcharge, and thus to damage. By monitoring the $H_2$ pressure in a $NiH_2$ cell, it is possible to provide some control for overcharging. The cell pressure was not included in the essentialized model, but could be without much increase in complexity. $H_2$ pressure can then be related to both overcharge and damage.

By using the instantaneous damage rate model, both a real-time damage rate sensor and an on-line damage monitor can be used. The damage rate sensor requires knowledge of the amount of stored material, and the present voltage. The damage monitor, or life predictor, requires the damage rate sensor, or can be implemented using an accelerated degradation model.

Ultimately a charge-discharge controller can use feedback from these sensors to trade-off lifetime with performance.

Other Chemistries and Fuel Cells

It is expected that this methodology can be readily applied to other chemistries, such as Li-based cells if cycle-life data is available. If this data is not available, a cycle-life model can be inferred from an accelerated degradation approach.

With regard to rechargeable fuel cells, this methodology should also be applicable, however it will be necessary to modify the essentialized model structure for the two fuel sources. It will also be necessary to understand the damage mechanisms associated with fuel cells. Alternatively, it is expected that a tracking controller should be able to immediately improve performance in a fuel cell.

Discharge Damage Control

Although discharge control was considered outside the scope of this research, various possibilities exist to reduce damage during the discharge part of the cycle. It was assumed in the damage modeling that the entire damage during the cycle took place over the charging part of the cycle. It is of course possible to apportion that damage over both the charge in the discharge parts of the cycle. In the former, the damage model is dictated by the form of the damage per cycle and would remain very much the same. Future research has generalized the damage model to include damage on both charging and discharging. With the availability of the generalized damage model, various strategies can be investigated which would control damage during discharge. The additional aspect of such research is that it could influence the manner in which the battery power is allocated. The acceptability of this would depend on the specific application.

Damage Testing and Future Data Needs

The present research allowed access to the Crane database. From our observation of the database, which is certainly not a detailed analysis of the database, we have found it to be an excellent resource for evaluation of battery designs and battery chemistries, etc. However, it was not clear that appropriate data was available in the database, for evaluating and creating damage models for particular battery types. It has been our observation, that in some of the battery literature, the battery design aspects and the battery operational aspects are not clearly delineated. It is important to separate these two areas, and to develop as a separate discipline, battery operational theory. In particular, clean operational data seems to be required. By this we mean tests to failure, with key parameters held constant One direction of future research would be to establish testing methods specific to obtaining usable damage (operational) models. This involves accurate assessment of the equation forms for cycle damage as well as proper statistical treatment of the data.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method for charging an electrical storage device so as to extend the life thereof, the method comprising the steps of:
    developing an essentialized cell model structure of the electrical storage device utilizing a hybrid cell model approach;
    determining model parameters for charge-discharge data of the structure;
    determining charge-discharge behavior of the structure in a voltage-charge plane;
    measuring voltage values of the structure based upon the charge-discharge behavior; and
    deriving an instantaneous damage rate from the measured voltage values, wherein the method achieves real time observation of the charge state of the electrical storage device.

2. The method according to claim 1, further comprising the steps of:
    developing a charging profile based upon the instantaneous damage rate, wherein the charging profile optimizes a charging current with respect to the damage per cycle so as to extend the overall life of the electrical storage device.

3. An optimal re-charging controller for an electrical storage device comprising:
    a simulation processor receiving an input signal sent to the electrical storage device and a measured output signal generated by the electrical storage device, wherein the simulation processor models a plurality of states of the electrical storage device and generates an estimated output signal so that the controller, utilizing a hybrid cell model approach, mitigates damage to the electrical storage device, and wherein the simulation processor comprises:
    a feedback component which receives the measured output signal and the estimated output signal to generate a correction signal; and
    an observer component which receives the correction signal and the input signal to generate the estimated output signal and an estimated internal state signal,
    wherein the estimated output signal converges a plurality of modeled dynamic states to corresponding states of the electrical storage device, and wherein the correction signal represents a real-time estimate of the amount of damage being done to the electrical storage device during re-charging, such that the controller achieves real time observation of the charge state of the electrical storage device.

4. The controller according to claim 3, wherein the damage rate sensor generates the estimated output signal such that a charging current applied to the electrical storage device is applied slowly at the beginning of the charge.

5. The controller according to claim 3, wherein the damage rate sensor generates the estimated output signal such that a charging current is applied more during a first half of a charging period than in a second half of the charging period.

6. The controller according, to claim 3, wherein the damage rate sensor generates the estimated output signal such that a charging current applied to the electrical storage device is decreased slowly to zero amperes at the end of a charging period.

7. The controller according to claim 3, wherein the observer component contains model parameters of the electrical storage device which are updated as they change over the life thereof.

8. The controller according to claim 3, further comprising:
a damage rate sensor which receives the input signal, the estimated output signal and aid estimated internal state signal to generate a damage rate signal which estimates the amount of damage being done to the electrical storage device.

9. The controller according to claim 8, further comprising:
a supervisory intelligent controller for receiving the estimated internal state signal, the measured output signal, the damage rate signal and a desired performance input signal, wherein the supervisory intelligent controller generates a charging profile signal.

10. The controller according to claim 9, further comprising:
a battery control system for receiving the measured output signal, the estimated internal state signal and the charging profile signal to generate the input signal, wherein the battery control system adjusts the input signal to optimize charging of the electrical storage device to maximize the life thereof.

11. The method of claim 1, wherein the hybrid cell model approach utilizes first principles dynamics.

12. The controller according to claim 3, wherein the hybrid cell model approach utilizes first principles dynamics.

* * * * *

UNITED STATES PATENT AND TRADEMARK OFFICE
CERTIFICATE OF CORRECTION

PATENT NO. : 7,489,107 B2  Page 1 of 1
APPLICATION NO. : 10/517674
DATED : February 10, 2009
INVENTOR(S) : T. Hartley et al.

It is certified that error appears in the above-identified patent and that said Letters Patent is hereby corrected as shown below:

Col. 32, Claim 1, lines 23-24: Change "hybrid cell model approach" to "hybrid cell-modeling approach"

Col. 33, Claim 4, lines 50-51: Change "hybrid cell model approach" to "hybrid cell-modeling approach"

Col. 34, Claim 15, lines 18-19: Change "and aid estimated" to "and an estimated"

Col. 34, Claim 17, lines 20-21: Change "and aid estimated" to "and an estimated"

Signed and Sealed this

Fifteenth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,489,107 B2  Page 1 of 1
APPLICATION NO. : 10/517674
DATED : February 10, 2009
INVENTOR(S) : Tom Hartley et al.

It is certified that error appears in the above-identified patent and that said Letters Patent is hereby corrected as shown below:

This certificate supersedes the Certificate of Correction issued September 15, 2009. The certificate should be vacated since the Certificate of Correction consists of errors to be corrected that does not correspond to text in printed patent. The corrections should appear as follows:

Col. 32, Claim 1, lines 23-24: Change "hybrid cell model approach" to "hybrid cell-modeling approach"

Col. 32, Claim 3, lines 50-51: Change "hybrid cell model approach" to "hybrid cell-modeling approach"

Col. 33, Claim 8, line 22: Change "and aid estimated" to "and an estimated"

Col. 34, Claim 11, lines 18-19: Change "hybrid cell model approach" to "hybrid cell-modeling approach"

Col. 34, Claim 12, lines 20-21: Change "hybrid cell model approach" to hybrid cell-modeling approach"

Signed and Sealed this

Eighth Day of December, 2009

David J. Kappos
*Director of the United States Patent and Trademark Office*